US012095838B2

(12) United States Patent
Tapse et al.

(10) Patent No.: US 12,095,838 B2
(45) Date of Patent: Sep. 17, 2024

(54) METHODS AND APPARATUS TO ACCURATELY CREDIT STREAMING SESSIONS

(71) Applicant: The Nielsen Company (US), LLC, New York, NY (US)

(72) Inventors: Sandeep Tapse, Odessa, FL (US); James Petro, Dunedin, FL (US); Shruthi Rao, Odessa, FL (US); Spoorthi Ramakanth Deshmukh, Hyderabad (IN); Raghuram Ranganathan, Tampa, FL (US); David Howell Wright, Safety Harbor, FL (US)

(73) Assignee: The Nielsen Company (US), LLC, New York, NY (US)

( * ) Notice: Subject to any disclaimer, the term of this patent is extended or adjusted under 35 U.S.C. 154(b) by 177 days.

(21) Appl. No.: 17/516,607

(22) Filed: Nov. 1, 2021

(65) Prior Publication Data
US 2023/0087758 A1 Mar. 23, 2023

(30) Foreign Application Priority Data
Sep. 14, 2021 (IN) .............................. 202111041129

(51) Int. Cl.
*H04L 12/00* (2006.01)
*G06F 18/23* (2023.01)
(Continued)

(52) U.S. Cl.
CPC .............. *H04L 65/80* (2013.01); *G06F 18/23* (2023.01); *G06N 20/00* (2019.01); *H04L 65/1066* (2013.01)

(58) Field of Classification Search
CPC ... H04L 65/80; H04L 65/1066; H04L 65/612; G06F 18/23; G06N 20/00
(Continued)

(56) References Cited

U.S. PATENT DOCUMENTS 11,050,834 B1 * 6/2021 Therani .................. H04L 67/52
11,336,506 B1 * 5/2022 Li ...................... H04N 21/2402
(Continued)

FOREIGN PATENT DOCUMENTS

| CN | 113422699 A | * | 9/2021 | ......... H04L 65/1006 |
| WO | WO-2013004309 A2 | * | 1/2013 | ......... H04L 65/1006 |
| WO | WO-2019234802 A1 | * | 12/2019 | ........... G06F 16/212 |

OTHER PUBLICATIONS

Siemens, "Anomaly Detection Service—Modules," accessed at https://developer.mindsphere.io/apis/analytics-anomalydetection/api-anomalydetection-basics.html#model-training-clustering, retrieved Aug. 31, 2021, 3 pages.
(Continued)

*Primary Examiner* — Frantz Coby

(57) ABSTRACT

In an example system, a meter device records streaming session information. Cluster creation circuitry trains a model by grouping information from multiple streaming sessions into clusters. All streaming sessions within a given cluster have matching media and streaming sources. Model executor circuitry assigns incoming streaming session information to a cluster or to noise. Cluster creation circuitry edits the model by creating new clusters out of information from multiple streaming sessions with similar attributes that were originally labeled as noise.

18 Claims, 14 Drawing Sheets

(51) Int. Cl.
*G06N 20/00* (2019.01)
*H04L 65/1066* (2022.01)
*H04L 65/80* (2022.01)

(58) Field of Classification Search
USPC .......................................................... 370/252
See application file for complete search history.

(56) References Cited

U.S. PATENT DOCUMENTS

| | | | | |
|---|---|---|---|---|
| 2007/0043565 | A1* | 2/2007 | Aggarwal | G10L 15/063 |
| | | | | 704/245 |
| 2009/0186606 | A1* | 7/2009 | Agarwal | H04L 65/403 |
| | | | | 455/416 |
| 2012/0106325 | A1* | 5/2012 | Janakiraman | H04L 47/15 |
| | | | | 370/230 |
| 2015/0333986 | A1* | 11/2015 | Pang | H04L 43/062 |
| | | | | 370/252 |
| 2016/0140978 | A1* | 5/2016 | Sharma | H04W 24/02 |
| | | | | 370/310 |
| 2018/0367590 | A1* | 12/2018 | Baldwin | H04W 12/08 |
| 2020/0177529 | A1* | 6/2020 | Trim | H04L 12/1822 |

OTHER PUBLICATIONS

Ester et al., "A Density-Based Algorithm for Discovering Clusters in Large Spatial Databases with Noise," KDD-96 Proceedings, Copyright 1996, AAAI, Institute for Computer Science, University of Munich, Germany, 6 pages.

Tapse et al., "Incorrect Provider-Content credit Detection using Machine Learning," Nielsen, Jul. 28, 2021, 4 pages.

Tapse et al., "How to avoid illogical Crediting of OTT Platform to Tuning/SVOD," Nielsen, White Paper, Jun. 30, 2020, 6 pages.

* cited by examiner

METHODS AND APPARATUS TO ACCURATELY CREDIT STREAMING SESSIONS

FIELD OF THE DISCLOSURE

This disclosure relates generally to audience measurement and, more particularly, to methods and apparatus to accurately credit streaming sessions.

BACKGROUND

In recent years, methods of presenting media have evolved. For example, a presentation session may now involve streaming media over a network to a consumer device. When a streaming session occurs, media may be presented by connecting the consumer device to a television. The streaming media comes from a streaming source, such as a platform (e.g., NETFLIX®) or a streaming live station (e.g., SLINGTV®). The streaming source is composed of various pieces of media, which may take the form of, but is not limited to, a movie, show, musical, comedy special, etc. Some pieces of media are only available on a single streaming source, where other pieces of media are available on multiple streaming sources. Streaming sources can both add and remove pieces of media from their platform or live station. Sometimes, a piece of media may be removed from one streaming source and added to a different streaming source.

Figure 1:
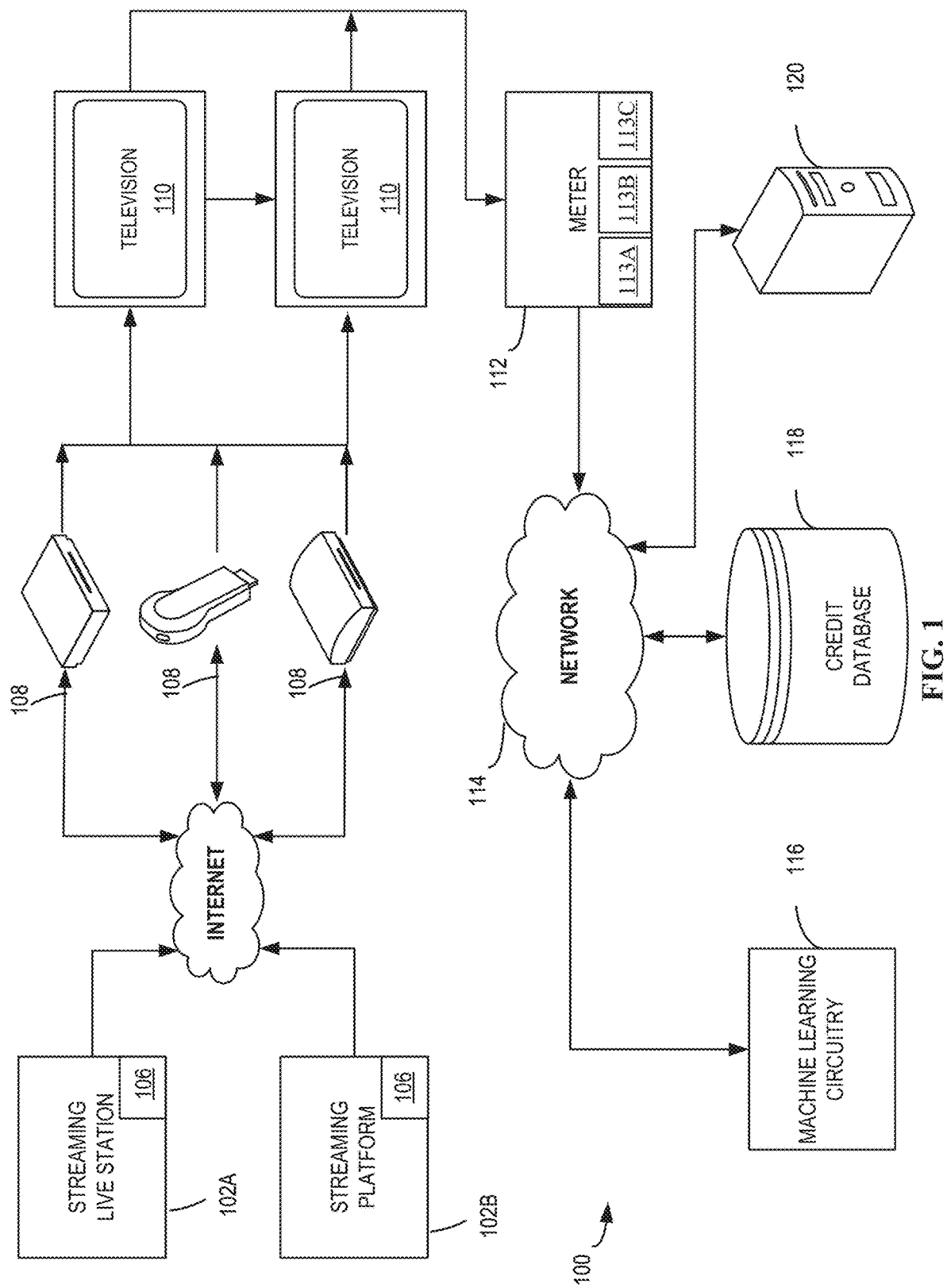
FIG. 1 is a block diagram of an example system to accurately credit a streaming session.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Many entities have an interest in understanding how users are exposed to media on the Internet. For example, an audience measurement entity (AME) desires knowledge of how users interact with media devices, such as smartphones, tablets, laptops, smart televisions, etc., and/or media presented thereon. For example, an AME may want to monitor media presentations made at the media devices to, among other things, monitor exposure to advertisements, determine advertisement effectiveness, determine user behavior, identify purchasing behavior associated with various demographics, etc.

AMEs coordinate with advertisers to obtain knowledge regarding an audience of media. For example, advertisers are interested in knowing the composition, engagement, size, etc. of an audience for media. For example, media (e.g., audio media, video media, image media, etc.) may be distributed by a media distributor to media consumers. Media distributors, advertisers, media producers, etc. have an interest in knowing the size of an audience for media distributed by the media distributor, the extent to which an audience consumes the media, whether the audience pauses, rewinds, fast-forwards the media, etc. In some examples, the term "media" includes programs, advertisements, clips, shows, images, etc., In some examples, the term "media" includes any type of audio and/or visual media and/or advertisement delivered via any type of distribution medium. Thus, media includes television programming and/or advertisements, radio programming and/or advertisements, movies, web sites, streaming media, etc. Unless context clearly dictates otherwise, for ease of explanation, the term "media" refers to a portion or a whole of a piece of media (e.g., movie, TV show, etc.).

In some instances, AMEs obtain knowledge regarding an audience of media by crediting when a particular piece of streaming media is presented on a television using an internet capable device. In this context, streaming media is defined to include media data (such as audio and/or video data) transmitted from a media source over a data network to a media device for presentation such that a portion of the media data is presented (possibly after buffering at the media device) while a subsequent portion of the media data is being received (and possibly buffered at the media device). In some examples, the media source corresponds to Amazon Music®, Amazon Video®, CBS All Access®, Disney+®, Google Play Music®, Hulu®, You Tube®, etc. (the media source may also be known as a content provider), the media device corresponds to, for example, a desktop computer, a laptop computer, a mobile computing device, a television, a smart phone, a mobile phone, an Apple® iPad®, an Apple® iPhone®, an Apple® iPod®, an Android™ powered computing device, a Palm® webOS® computing device, etc, and the data network corresponds to the Internet and/or a private network. In some examples, the media data is transmitted from the media source to the media device using one or more data transport streams established according to one or more existing and/or future network streaming communication protocols, such as Dynamic Adaptive Streaming over HTTP (DASH), HTTP live streaming (HLS), Real-time Transport Protocol (RTP), etc. Additionally, a panelist can be anyone who agrees to share information from their media streaming with an AME. This media streaming, which may also be referred to as a streaming session, is associated with information that is stored and analyzed once the session is credited. The information includes, but is not limited to, the name of the streaming media and the name of the streaming source. As used herein, "the example AME" will refer to an AME that uses the disclosed system to properly credit streaming sessions.

According to some examples, streaming sessions are detected by a meter that is associated with (e.g., connected to) the media presentation device where a media presentation occurs. The example AME requires information regarding the association between a specific internet-capable device and a specific media presentation device to credit a streaming session. Therefore, if a panelist moves the internet-capable device to a different media presentation device without informing the example AME, the device-to-media presentation device association mentioned above is no longer accurate. This can cause streaming sessions with illogical associations of media and source to be allowed. One example of such an illogical association would be when media from a live television station (e.g., a basketball game on a sports network) is credited to a streaming source 102 (e.g., NETFLIX®). Another example is when streaming media is credited to a streaming source that does not provide said media (e.g., Stranger Things, a show exclusive to NETFLIX®, is credited to HULU®).

Other sources of error unrelated to device-to-media presentation device association may lead to an illogical association between media and streaming source. The examples disclosed herein prevent the crediting of any illogical association between media and streaming source, regardless of whether the error was caused by an incorrect device-to-media presentation device association or other source.

FIG. 1 is a block diagram of an example system to accurately credit a streaming session. The example system 100 contains a streaming platform 102A, streaming live station 102B, streaming media 106, internet capable devices 108, one or more televisions 110, a meter 112, a network 114, machine learning circuitry 116, a credit database 118, and a server 120.

A streaming source 102 is any service that provides streaming media to its audience via a data network. A streaming source may function as a streaming platform 102A, which upload media 106 to their servers so that audiences may view the media whenever they wish. Examples of streaming platforms include but are not limited to NETFLIX®, HULU®, AMAZON PRIME VIDEO®, DISNEY+®, etc. Alternatively, a streaming source 102 may function as a streaming live station 102B, where audiences can only access the media 106 playing on the channels at the time of the presentation session. Examples of a streaming live station 102B include but are not limited to SLINGTV®, PLUTOTV®, etc. In some examples, a single streaming service may offer both platform 102A and live station 102B functionality to their users. As used herein, the term "streaming source 102" may refer to either of the streaming platform 102A or the streaming live station 102B.

The internet capable devices 108 of FIG. 1 access media 106 from a streaming source 102. Examples of internet capable devices 108 may include but are not limited to a DVD/Blu-Ray player, CHROMECAST®, ROKU®, XBOX®, PLAYSTATION®, etc. In some examples, the functionality of the internet capable devices 108 may be integrated into the television 110 (or equivalent device). In some such examples, a "smart" television connects directly to the internet and runs an operating system that is capable of streaming media directly to the television. In some examples, the operating system may be considered an internet capable device 108.

The example meter 112 of FIG. 1 is connected to one or more televisions 110. In the example system 100, the televisions 110 access media from internet capable devices 108 and connect to the example meter 112. In some example systems, the televisions 100 may alternatively be internet capable media presentation devices such as phones, tablets, laptops, speakers, radio, vehicle sound system, etc. In some such example systems, the phones, tablets, laptops, speakers, radio, vehicle sound system, etc. access and present the media using a software application developed by a streaming source 102.

While the example system 100 shows two televisions, in some examples, a larger number of televisions may connect to the example meter 112. In alternative examples, only one television connects to the example meter 112. As used herein, any reference to "the television 110" refers to a singular unit in the one or more televisions 110.

When media 106 is presented on the television 110, streaming information 113A and media information 113B are recorded by the example meter 112. In the example system 100, the session information 113A is any information that is unique to a streaming session. Session information 113A may include but is not limited to an identifier of the specific internet capable device 108 used for streaming, an identifier of the specific television 110 used for streaming, the time and date of the streaming session, the duration of the streaming session, and demographic information regarding any panelist(s) who may be present during the streaming session. In the example system 100, media information 113B is any information that may be used to describe the media. Media information 113B may include but is not limited to the name of the media, the type of media (e.g., movie, show, etc.), genre, season number, episode number, release date, etc. The media information 113B may additionally list which streaming source(s) 102 the media is available on.

The example meter 112 also generates a media/streaming source association 113C. As used herein, the term "media/streaming source association 113C" refers to the minimum amount of information needed to describe a streaming session. A media/streaming source association 113C includes at least the title of the media 106, the name of streaming source 102, and the time and date of the streaming session. The example meter 112 is explored further in FIG. 2.

The network 114 of FIG. 1 connects and facilitates communication between the example meter 112, machine learning circuitry 116, credit database 118, and server 120. In this example, the network 114 is the Internet. However, the example network 114 may be implemented using any suitable wired and/or wireless network(s) including, for example, one or more data buses, one or more local area networks (LANs), one or more wireless LAN (WLANs), one or more cellular networks, one or more coaxial cable networks, one or more satellite networks, one or more private networks, one or more public networks, etc. As used above and herein, the term "communicate" including variances (e.g., secure or non-secure communications, compressed or non-compressed communications, etc.) thereof, encompasses direct communication and/or indirect communication through one or more intermediary components and does not require direct physical (e.g., wired) communication and/or constant communication, but rather includes selective communication at periodic or aperiodic intervals, as well as one-time events.

The example machine learning circuitry 116 of FIG. 1 uses machine learning techniques to determine if a given presentation session has a valid media/streaming source association 113C. The example machine learning circuitry 116 is discussed in further detail in conjunction FIG. 3.

A valid media/streaming source association 113C includes media 106 that is accessed by an internet capable device 108, presented on a television 110, and available on the streaming source 102 at the time of the streaming session. In contrast, an invalid media/streaming source association 113C is a pair of media 106 and streaming source 102 for a particular streaming session that does not meet the requirements to be valid. For instance, media of a different form, such as but not limited to live cable television, live antenna television, radio, websites, etc., would form an invalid media/streaming source association 113C. A media/streaming source association 113C may also be invalid if the media 106 is only available on a different streaming source(s) 102 than the one listed in the association, or if the media 106 was not available on the streaming source 102 at the time of the presentation session.

The example credit database 118 of FIG. 1 stores information for all streaming sessions that have a valid media/streaming source association 113C. As used herein, the term "crediting a streaming session" or any derivate refers to storing information relating to a streaming session with a valid media/streaming source association 113C in the example credit database 118. The contents of the information stored for a credited streaming session are explored further in FIG. 3.

The example credit database 118 of the example system 100 is implemented by any memory, storage device and/or storage disc for storing data such as, for example, flash memory, magnetic media, optical media, solid state memory, hard drive(s), thumb drive(s), etc. Furthermore, the data stored in the example credit database 118 may be in any data format such as, for example, binary data, comma delimited data, tab delimited data, structured query language (SQL) structures, etc. While, in the example system 100 the credit database 118 is illustrated as a single device, the example credit database 118 and/or any other data storage devices described herein may be implemented by any number and/or type(s) of memories.

The example server 120 of FIG. 1 is managed by an AME. The example server 120 hosts machine readable instructions for the meter 112, machine learning circuitry 116, and credit database 118 to operate and communicate with one another. Additionally, the example server 120 may host circuitry that enables the AME to utilize the information stored in the example credit database. In some examples, the AME may use the information to create and publish ratings for various media.

When an internet capable device 108 is connected to the television 110, a device-to-TV association is made during the next installation or maintenance of the meter 112. If a panelist moves an internet capable device and does not contact the AME to update the device-to-TV association, the accuracy of the media/streaming source association 113C may be affected. For example, suppose a meter connects to TV A and TV B. Additionally, suppose a device-to-TV association is made between a CHROMECAST® device and TV A. Next, a panelist disconnects the CHROME- CAST® device from TV A and reconnects it to TV B without contacting the AME to update the association. Later, if a panelist is watching a sports network live on cable television using TV A during the same time that another panelist is using the CHROMECAST® on TV B to access NETFLIX®, the meter 112 may use the invalid device-to-TV association to record the live sports network media with NETFLIX® under a single streaming session.

An alternative example of an invalid media/streaming source association 113C is when streaming media is paired with a streaming source 102 that does not provide the media. For example, suppose a meter connects to TV A and TV B. Additionally, suppose a device-to-TV association is made between a ROKU® device and TV A, and a device-to-TV association is made between an XBOX® and TV B. Suppose further that the ROKU® device has access to NETFLIX®, and that the XBOX® has access to HULU®. Next, a panelist disconnects the CHROMECAST® device from TV A and reconnects it to TV B without contacting the AME to update the association. Later, if the panelist watches Stranger Things R, which is media exclusive to NETFLIX®, on the CHROMECAST® using Television B, the meter 112 may use the invalid device-to-TV association to associate the Stranger Things® media with HULU® under a single streaming session.

Previous methods for crediting streaming sessions do not verify the media/streaming source association 113C, so both the sports network/NETFLIX® association and Stranger Things®/HULU® association would be stored in the credit database 118 and improperly utilized by an AME. In the example system 100, however, the example machine learning circuitry 116 identifies both the sports network/NETFLIX® association and the Stranger Things®/HULU® association as invalid and prevents them from entering the credit database. This allows for a more accurate credit database 118 and better enables the example AME to use the data.

Figure 2:
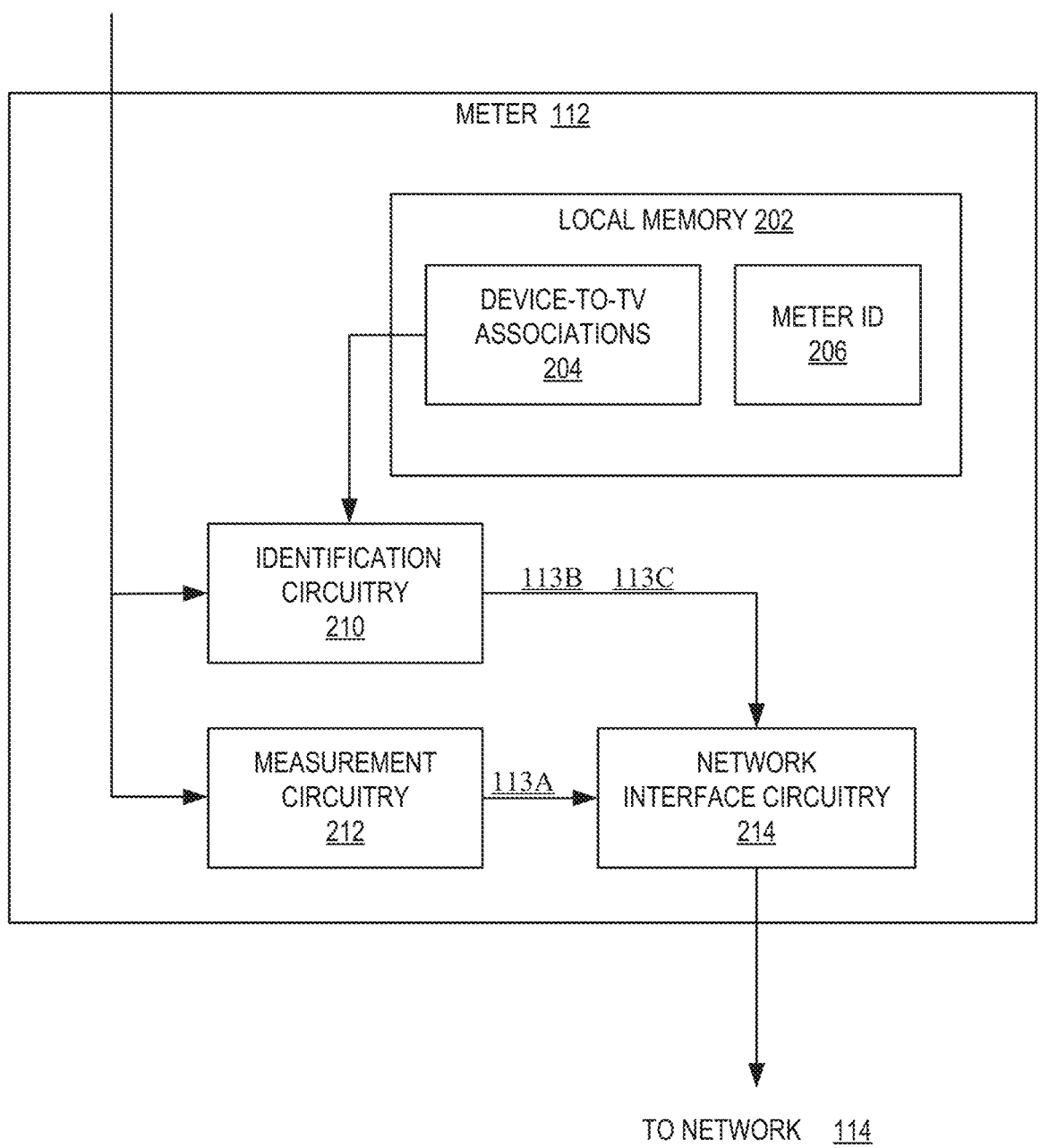
FIG. 2 is a block diagram of an example implementation of the meter of FIG. 1 for metering streaming sessions.

FIG. 2 is a block diagram of an example implementation of the meter of FIG. 1 for metering streaming sessions. The example meter 112 of FIG. 2 includes local memory 202, measurement circuitry 212, identification circuitry 210, and network interface circuitry 214.

The local memory 202 of FIG. 2 stores data preprogrammed into the example meter 112. In the example meter 212, the local memory 202 includes device-to-TV associations 204, and a meter-ID 206. In some examples, the device-to-TV associations 204 are not stored in the example meter 120. Ins some such examples, the example meter 112 uses the network 114 to access the device-to-TV associations 204, which are stored on the server 120 or a database managed by an AME.

The measurement circuitry 212 of FIG. 2 collects session information 113A from a television 110. The session information 113A is any information that is unique to a streaming session. Session information 113A may include but is not limited to an identifier of the specific internet capable device 108 used for streaming, an identifier of the specific television 110 used for streaming, the time and date of the streaming session, and the duration of the streaming session. In some examples, the example meter 112 collects session information 113A through a wired connection to the television 110. In other examples, the meter 112 communicates with the television wirelessly. While information such as a meter-ID or device-to-TV associations may be pre-programmed into the meter 112 before installation, any information that is unique to a streaming session is recorded through the measurement circuitry 212.

The identification circuitry 210 of FIG. 2 accesses streaming media from the television 110 and identifies both the media 106 and the streaming source 102. The identification circuitry 210 first matches audio/visual information from the television 110 to a media identifier. A media identifier is any system that uniquely identifies media and provides associated media information 113B. Media information 113B is any information that may be used to describe the media. Media information 113B may include but is not limited to the name of the media, the type of media (e.g., movie, show, etc.), genre, season number, episode number, release date, and which streaming source(s) 102 the media is available on.

The example identification circuitry 210 uses audio data from the television 110 to identify a media. In order to obtain the media, the internet capable device 118 requested information from a website or application provided by the streaming source. As a result, the streaming source used in the streaming session is known by the internet capable device 118. The example identification circuitry 210 may use the device-to-tv associations 204 and the meter ID 206 to match a television 110 to an internet capable device 118. In doing so, the example identification circuitry 210 forms a media/streaming source association 113C unique to a specific streaming session.

The network interface circuitry 214 accepts data from the meter and shares it on the network 114 to be analyzed and potentially credit the streaming session. Data received by the network interface circuitry 214 includes at least the media/streaming source association 113C from the measurement circuitry, but may additionally include the meter-ID 206, additional media information from the identification circuitry 210, and any additional session information from the measurement circuitry 212.

When media is presented on a television 110, the meter 112 of FIG. 2 creates and assigns a media/streaming source association 113C to that streaming session. Because of incorrect device-to-tv associations or other sources of error, the media/streaming source association 113C may not be accurate. The example machine learning circuitry 116 analyzes and prevents inaccurate media/streaming source associations 113C from being credited. These inaccurate media/streaming source associations 113C would otherwise have been improperly used by AMEs to create and publish ratings for various media.

Figure 3:
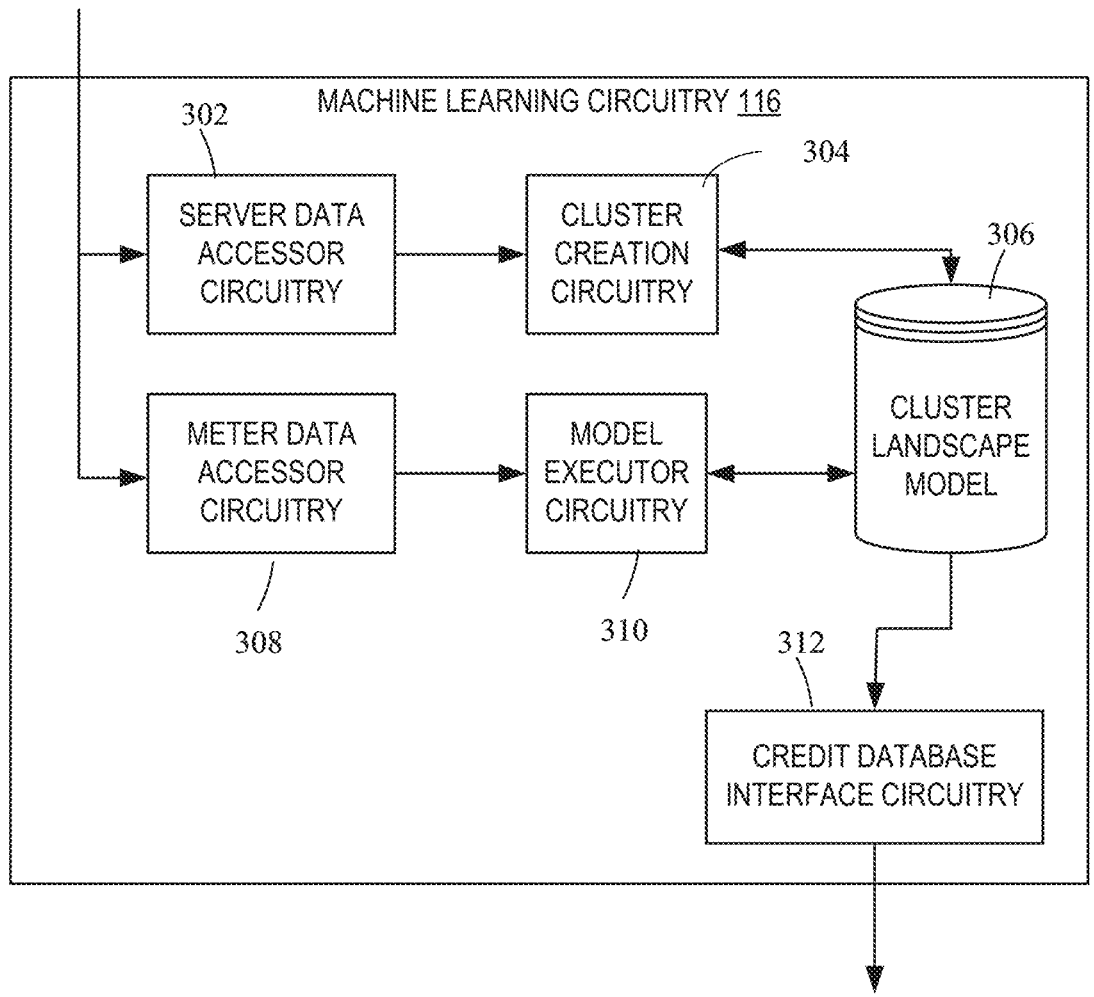
FIG. 3 is a block diagram of an example implementation of the machine learning circuitry of FIG. 1 to accurately credit streaming sessions.

FIG. 3 is a block diagram of an example implementation of the example machine learning circuitry 116 of FIG. 1 to accurately credit streaming sessions. The example machine learning circuitry 116 contains example server data accessor circuitry 302, example cluster creation circuitry 304, example meter data accessor circuitry 308, an example cluster landscape model 306, example meter data accessor circuitry 308, example model executor circuitry 310, and example credit database interface circuitry 312.

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations. In the example machine learning circuitry 116, the model is trained to identify streaming sessions as valid or invalid.

The example server data assessor circuitry 302 of FIG. 3 accesses training data to be used to train a machine learning model. In the example machine learning circuitry 116, training data comes from NETSIGHT® meter information provided by the example AME. While the example meter 112 uses the device-to-TV associations 204 to make the media/streaming source association 113C that may be inaccurate, the NETSIGHT® meter runs on the internet capable device 118 or television 110 and may record both streaming information 113A and a media/streaming source association 113C based on network traffic. The media/streaming source association 113C may be further linked to a Mobile Ad Identifier (MAID). A MAID is a string or set of numbers assigned by an operating system. The MAID uniquely identifies sessions where an internet capable device 108 or television 110 access a streaming source 102 via the internet. After matching audio/visual data from a streaming session to a MAID, the example identification circuitry 210 links the MAID to a GRACENOTE® ID. The GRACENOTE® ID is a system of uniquely identifying a media within the GRACENOTE® system, which collects and provides media information 113B for a global collection of various media.

By using the media information 113B from the GRACENOTE® system as a ground truth, meter information 113 from the NETSIGHT® meter can be verified as accurate and used as training data. In some examples, other media/streaming source associations 113C that are known to be true or highly likely to be true may be used as training data.

While the foregoing refers to the NETSIGHT® meter, any metering software or device capable to determining media presentations and the source (e.g., the particularly streaming provider) associated with the media presentation may be utilized to generate data indicative of a link between a particular media (e.g., a particular program, episode, etc.) and a source (e.g., the streaming provider). While the foregoing refers to the GRACENOTE® system, and compilation (e.g., database) of media information may be utilized.

As used herein, the term "meter information" refers to any information that is used to credit a unique streaming session. Meter information 113 includes at least the media/streaming source association 113C for the streaming session, and may additionally include the any of the session information 113A and any of the media information 113B for the streaming session. When used in the singular, "meter information" refers to the meter information 113 of a single streaming session. When used in the plural, "meter information" refers to the collective meter information 113 of multiple streaming sessions.

The example cluster creation circuitry 304 of FIG. 3 performs unsupervised training of a machine learning model based on the training data. This training is unsupervised because it employs density-based spatial clustering of applications (DBSCAN), such as the DBSCAN approach described by Ester. Martin, et al.: "*A density-based algorithm for discovering clusters in large spatial databases with noise.*" Kdd. Vol. 96. No. 34. 1996. The use of the DBSCAN approach within the example system 100 is explored in further detail in conjunction with FIG. 9. The cluster creation circuitry may also adjust the machine learning model, which is explored more detail in conjunction with FIG. 4.

As a result of the training with DBSCAN, the example cluster creation circuitry 304 generates a cluster landscape model 306, a type of machine learning model that is used by the example model executor circuitry 310 and is both generated and adjusted by the cluster creation circuitry 304.

The example cluster landscape model 306 of FIG. 3 stores meter information 113 for multiple streaming sessions, as well as model information generated by the cluster creation circuitry 304 and model executor circuitry 310. The example cluster landscape model 306 of the illustrated is implemented by any memory, storage device and/or storage disc for storing data such as, for example, flash memory, magnetic media, optical media, solid state memory, hard drive(s), thumb drive(s), etc. Furthermore, the data stored in the example cluster landscape model 306 may be in any data format such as, for example, binary data, comma delimited data, tab delimited data, structured query language (SQL) structures, etc. While, in the illustrated example, the example cluster landscape model 306 is illustrated as a single device, the example cluster landscape model 306 and/or any other data storage devices described herein may be implemented by any number and/or type(s) of memories. The example cluster landscape model 306 is explored more in FIGS. 4 and 5.

The example meter data accessor circuitry 308 of FIG. 3 accesses meter information from the example meter 112 via the network 114. While the example meter data accessor circuitry 308 may access meter information 113 from multiple streaming sessions at once, this explanation will focus on meter information 113 from a single presentation session for simplicity.

The example model executor circuitry 310 of FIG. 3 stores the media information provided the example meter data accessor circuitry 308 in the example cluster landscape model 306. The model executor circuitry 310 further determines if a given media/streaming source association 113C is valid or invalid. One or more media/streaming source associations 113C may be evaluated. In some examples, the model executor circuitry 310 is composed of multiple machines or processors that execute different media/streaming source associations 113C in parallel. In an alternative example, the example model executor circuitry 310 operates on each media/streaming source association 113C sequentially. The example model executor circuitry 310 is explored more in FIGS. 4 and 5.

The credit database interface circuitry 312 identifies media information in the example cluster landscape model 306 with valid media/streaming source association 113C. The method of identifying the valid media information 113 within the model is explored more in FIGS. 4 and 5. The credit database interface circuitry 312 uses the network to store the valid media information 113 in the example credit database 118, thereby crediting the streaming session(s) associated with the valid media information 113.

Using previously known methods of crediting streaming sessions, true positive streaming sessions (that is, stream sessions with invalid media/streaming source association 113C due to a device-to-TV error or error of another source) would be stored in the credit database and improperly utilized by an AME. The example model executor circuitry 310 prevents these true positives from entering the credit database 118 but may also temporarily prevent valid media/streaming source associations 113C from entering the credit database 118 when the model becomes inaccurate. Therefore, when the example cluster creation circuitry 304 adjusts the model, the example credit database interface circuitry 312 re-evaluates all meter information in the cluster landscape model 306 and credits any sessions that were previously identified as having invalid media/streaming source but currently identified as valid. Through this re-evaluation, false positive associations become recognized as valid and enter the credit database 118. As a result, the example machine learning circuitry 116 removes invalid media/streaming source associations 113C while continuing to credit all valid media/streaming source associations 113C.

Figure 4:
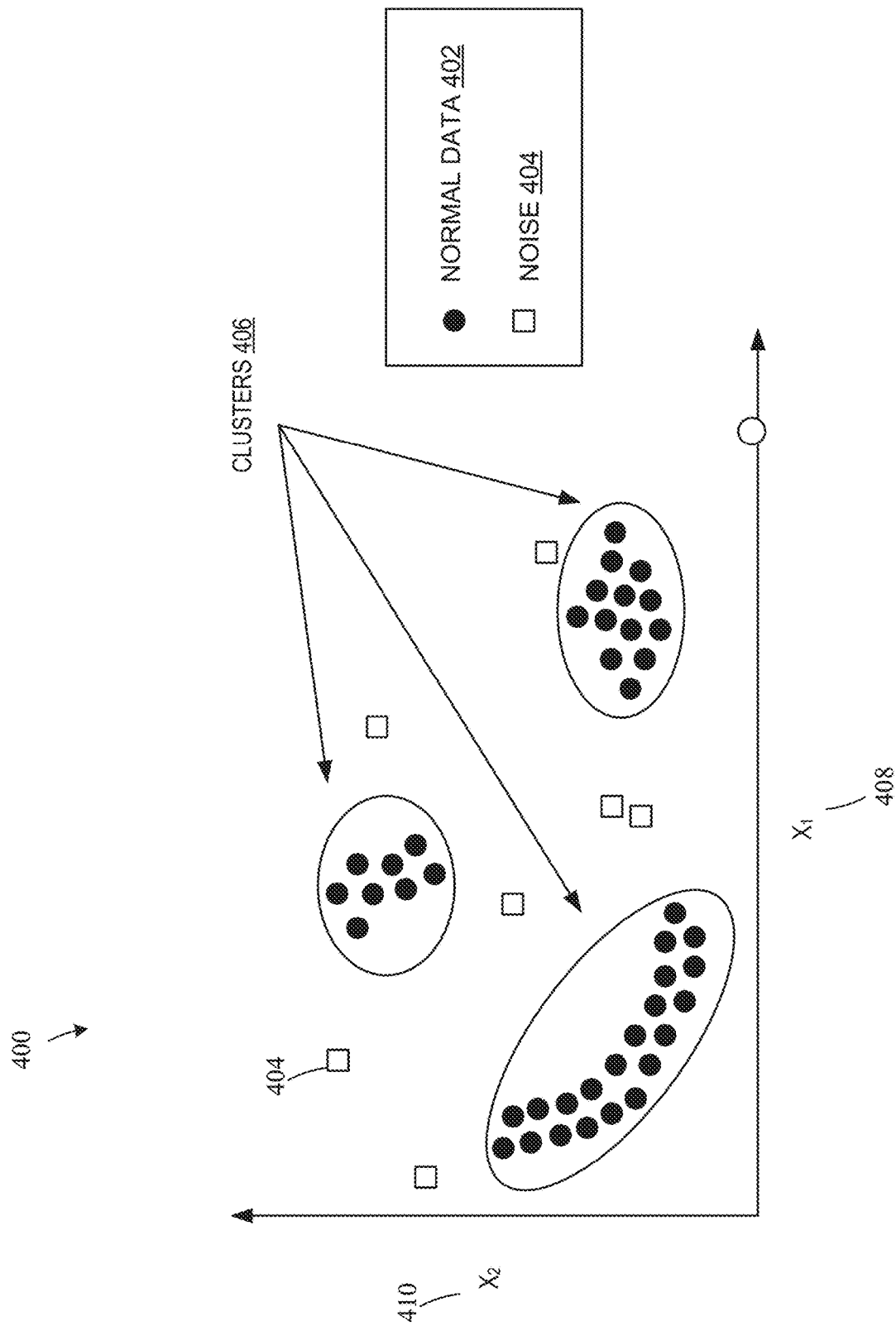
FIG. 4 is an illustration of the training of a cluster landscape model of FIG. 3.

FIG. 4 is an illustration of the training of a cluster landscape model of FIG. 3. The illustrated example 400 includes normal data 402, noise 404, clusters 406, an x1-dimension 408, a x2-dimension 410.

The illustrated example 400 is composed of data points, where each data point is meter information 113 from a unique streaming session. The data points are categorized into normal data 402 and noise 404, where normal data 402 is defined as any data point inside a cluster 406 and noise 404 is any data point outside a cluster 406. A cluster 406 has a minimum number of data points and a maximum distance between data points that compose the cluster 406. The example cluster creation circuitry 304 assigns data points to a cluster 406 using DBSCAN.

The distance between two data points is determined using parameters from a model's dimensions. The illustrative example 400 only includes an x1-dimension 408 and an x2-dimension 410 to allow the distance between two data points to be visualized on a 2D plane, for simplicity. In practice an example cluster landscape model 306 may have any number of dimensions, thereby forming an n-dimensional distance. Because the distance calculation is the main mechanism for determining if a point is in a cluster and therefore if it should be credited, the example machine learning circuitry 116 uses each of the parameters that compose the meter information 113 in the distance calculation. These parameters are explored further in FIG. 6. The process of calculating a distance between two data points is explored further in FIG. 9.

In the context of the example machine learning circuitry 116, a cluster 406 is meter information 113 from multiple streaming sessions, where the meter information 113 of each session in the cluster 406 has the same media/streaming source association 113C. This meter information is considered valid and is credited by the credit database interface circuitry 312. Because a media 106 may be available on more than one streaming source, it is possible for a media 106 to represent multiple clusters. For example, in the illustrated example 400, one of the clusters 406 may include meter information 113 where Big Bang Theory S1E1 was streamed on AMAZON PRIME VIDEO®, while another of the clusters 406 includes meter information 113 where Big Bang Theory S1E1 was streamed on HULU®. Similarly, because each cluster represents a single media/streaming source association 113C, each episode of a given show would have different clusters 406. Therefore, media information 113C from Big Bang Theory S1E1 streamed on HULU® is assigned to a different cluster than Big Bang Theory S1E2 streamed on HULU®.

In contrast, any meter information 113 that is outside of a cluster 406 is considered invalid and is not credited at the time of assignment. True positive meter information 113 (e.g., media information generated in error due to an incorrect device-to-TV association or other source) is not assigned to a cluster and remains outside of any cluster during the model adjustment process. This is different from false positive meter information 113 (e.g., media information that should be credited but is initially considered invalid), which is re-assigned to a cluster 406 and considered to be valid during the model adjustment process. The model adjustment process is explored more in FIG. 5. Any meter information 113 not in a cluster 406 is also referred to as noise 404.

The example credit database interface circuitry 312 identifies any meter information 113 within the clusters 406 as valid and stores them in the credit database 118 via the network 114. In doing so, any streaming session that corresponds to one of the meter information 113 in a cluster 406 is credited.

Figure 5:
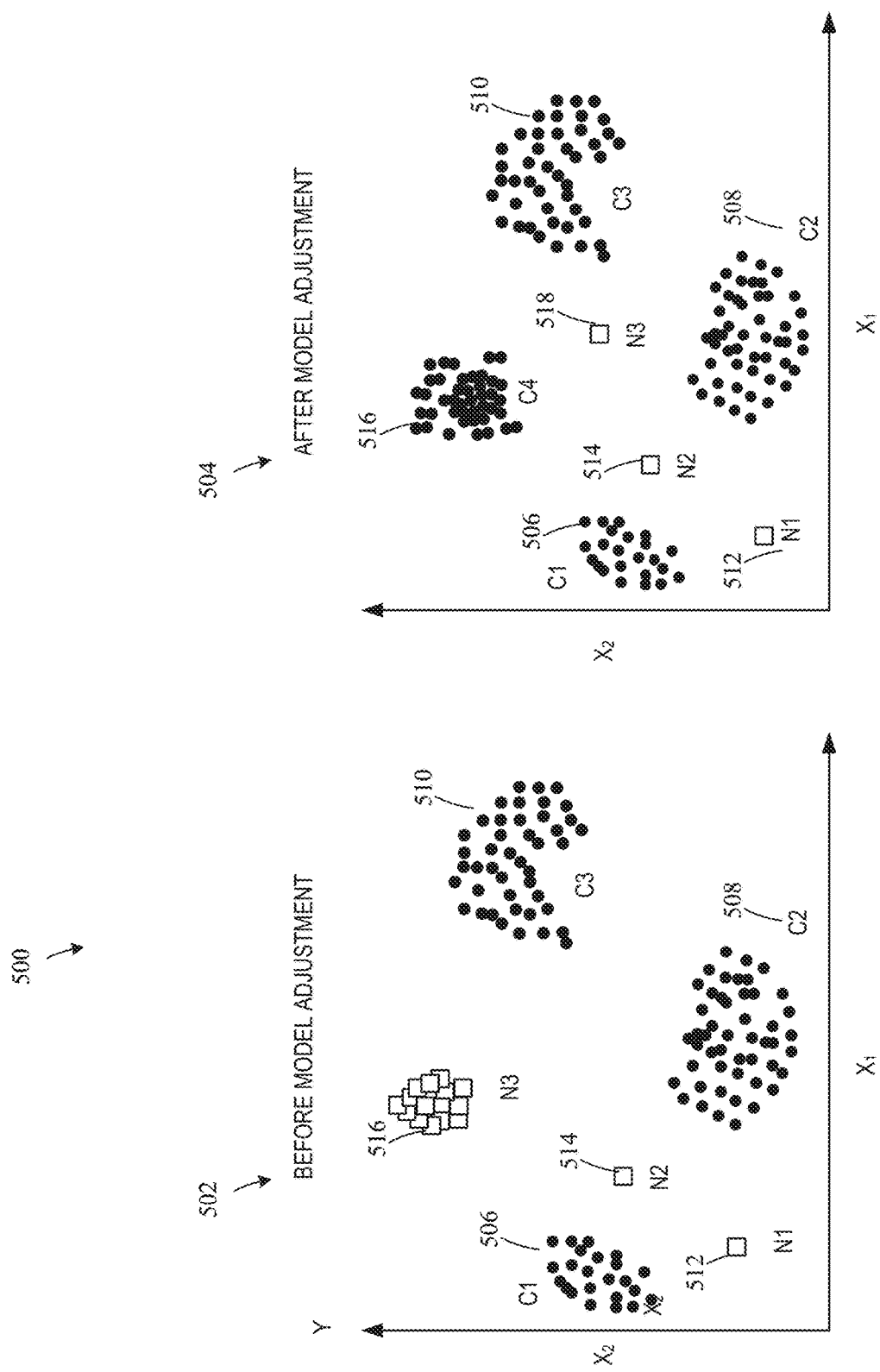
FIG. 5 is an illustration of the adjusting of a cluster landscape model of FIG. 3.

FIG. 5 is an illustration of the adjusting of a cluster landscape model of FIG. 3. The example illustration 500 includes an example cluster landscape model before adjustment 502, and the same example cluster landscape model after adjustment 504. The example cluster landscape model includes clusters C1 506, C2 508, C3 510, noise N1 512, N2 514, and collection of data points 516. The example cluster landscape model after adjustment 504 additionally includes additional noise N3 518.

The example cluster creation circuitry 304 of FIG. 3 adjusts the cluster landscape model 306 by creating new clusters. This adjustment may occur whenever a media 106 is added to a streaming source. An example model adjustment is shown in the example illustration 500. Here, the cluster C3 510 contains the credited presentation sessions where panelists streamed The Office S1E1 on the streaming platform 102A NETFLIX®. Further, in the example illustration 500 the collection of data points 516 are presentation sessions that include The Office S1E1 on the streaming platform 102A PEACOCK®. The example cluster landscape model before adjustment 502 shows the model shortly after PEACOCK® debuted. In this example, The Office S1E1 has not been available on PEACOCK® long enough for panelists to generate the minimum number of presentation sessions needed to be considered a cluster. Therefore, the collection of data points 516, which represent all presentation sessions of The Office S1E1 on PEACOCK®, are temporarily assigned as noise N3 within the example cluster landscape model before adjustment 502.

In the example illustration 500, the example cluster landscape model after adjustment 504 shows the model some amount of time after the example cluster landscape model before adjustment 502 is shown. In this time, panelists have generated more presentation sessions of The Office S1E1 on PEACOCK®. Media information 113 from these presentation sessions is placed within the collection of data points 516 because their parameters are similar across the n dimensions used to compute distance. As such, the collection of data points 516 has passed the minimum number of presentation sessions needed to be considered a cluster. Because the cluster creation circuitry 304 runs the known DBSCAN algorithm whenever new data points are added to the example cluster landscape model, it re-assigns the collection of data points 516 to be a cluster C4. This new cluster is identified by the example credit database interface circuitry 312, which interfaces with the network 114 to add every presentation session that constitutes C4, the collection of data points 516, to the credit database 118. Once in the credit data base, the example AME may use the credited media information for further analysis, rating information, etc.

It is important to note that the date and time is one of the n-dimensions used to calculate distance and proximity between media information in the example cluster landscape model 306. By doing so, the example machine learning circuitry 116 prevents media information generated in error from being assigned to a cluster that is no longer active. An example of this can be seen in the illustrated example 500. Around the same time that The Office S1E1 was added to PEACOCK®, the show was also removed from NETFLIX®, making the cluster C3 510 inactive. Since then, media information 113 listing The Office S1E1 on NETF- LIX® was created in error due to an incorrect device-to-TV association. Because time is considered in distance calculations, said media information 113 will be too far away from the cluster C3 510, which represents properly credited media information listing The Office S1E1 on NETFLIX® before its removal from the streaming platform, to be considered part of the cluster. Therefore, the example model executor circuitry 310 assigns the media information 113 as noise N3 518, and the presentation session is not credited.

In some examples, the apparatus includes means for accurately credit streaming sessions. For example, the means for accurately crediting may be implemented by example machine learning circuitry 116. In some examples, the example machine learning circuitry 116 may be implemented by machine executable instructions such as that implemented by at least, blocks 602-606 of FIG. 6, 702-712 of FIG. 7, 802-810 of FIG. 8, and 902-916 of FIG. 9 executed by processor circuitry, which may be implemented by the example processor circuitry 1000 of FIG. 10, the example processor circuitry 1100 of FIG. 11, and/or the example Field Programmable Gate Array (FPGA) circuitry 1200 of FIG. 12. In other examples, the example machine learning circuitry 116 is implemented by other hardware logic circuitry, hardware implemented state machines, and/or any other combination of hardware, software, and/or firmware. For example, the example machine learning circuitry 116 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the example machine learning circuitry 116 of FIG. 1 is illustrated in FIG. 3, one or more of the elements, processes, and/or devices illustrated in FIG. 3 may be combined, divided, re-arranged, omitted, eliminated, and/or implemented in any other way. Further, the example cluster creation circuitry 304, the example model executor circuitry 310, and/or, more generally, the example machine learning circuitry 116 of FIG. 1, may be implemented by hardware, software, firmware, and/or any combination of hardware, software, and/or firmware. Thus, for example, any of the example cluster creation circuitry 304, the example model executor circuitry 310, and/or, more generally, the example machine learning circuitry 116 of FIG. 1, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example cluster creation circuitry 304, the example model executor circuitry 310, and/or, more generally, the example machine learning circuitry 116 of FIG. 1 is/are hereby expressly defined to include a non-transitory computer readable storage device or storage disk such as a memory, a digital versatile disk (DVD), a compact disk (CD), a Blu-ray disk, etc., including the software and/or firmware. Further still, the example machine learning circuitry 116 of FIG. 1 may include one or more elements, processes, and/or devices in addition to, or instead of, those illustrated in FIG. 4, and/or may include more than one of any or all of the illustrated elements, processes and devices.

A flowchart representative of example hardware logic circuitry, machine readable instructions, hardware implemented state machines, and/or any combination thereof for implementing the machine learning circuitry 116 of FIG. 1 is shown in FIG. 3. The machine readable instructions may be one or more executable programs or portion(s) of an executable program for execution by processor circuitry, such as the processor circuitry 1000 shown in the example processor platform 1000 discussed below in connection with FIG. 10 and/or the example processor circuitry discussed below in connection with FIGS. 11 and/or 12. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIGS. 6-9, many other methods of implementing the example machine learning circuitry 116 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 6-9 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 6:
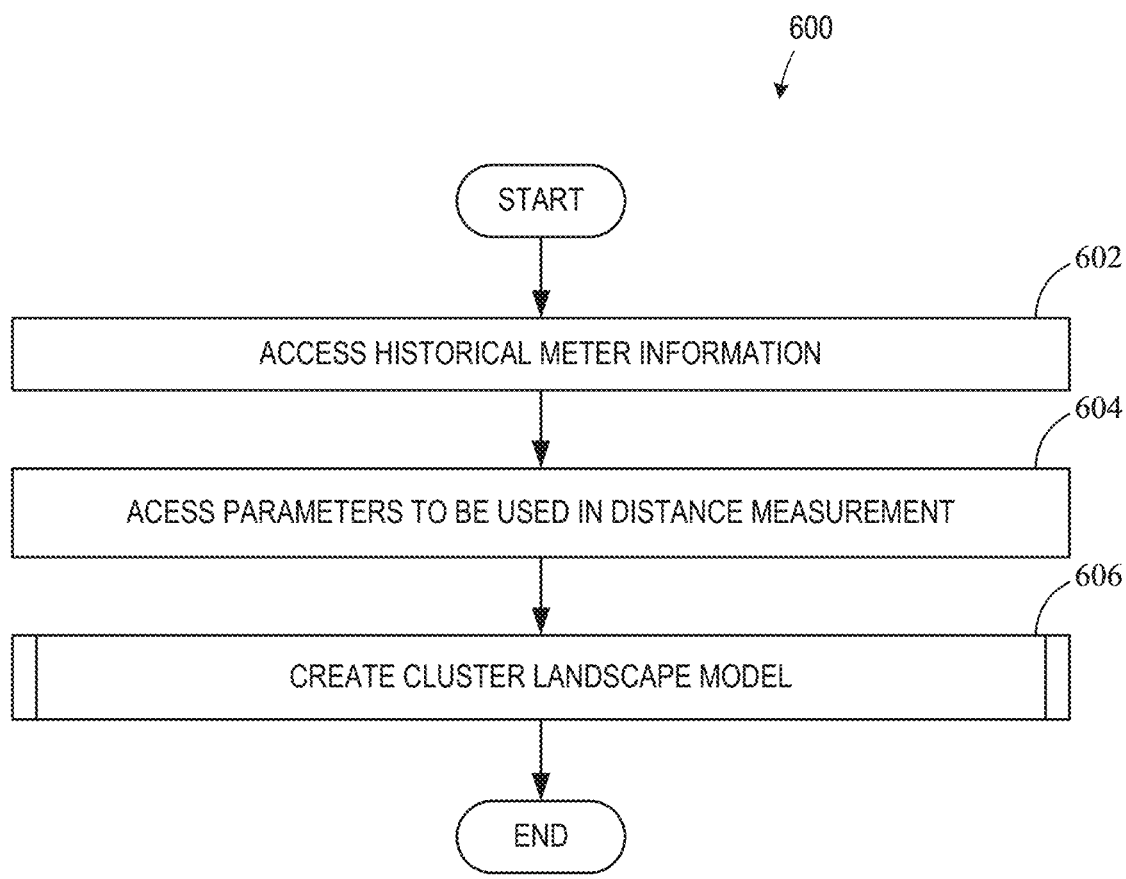
FIG. 6 is a flowchart representative of example machine readable instructions that may be executed by example processor circuitry to implement the training of a cluster landscape model to accurately credit streaming sessions.

FIG. 6 is a flowchart representative of example machine readable instructions that may be executed by example processor circuitry to implement the training of a cluster landscape model to credit streaming sessions. The example process 600 begins when the server data accessor circuitry accesses historical meter information bock 602. The example server data assessor circuitry also access a list of parameters to be used in the distance measurement, block 604. This list of parameters is determined by the example AME and are the factors considered when determining if meter information from a streaming session is assigned to a cluster and credited or assigned as noise and not credited. The list includes at least the name of media name, name of streaming source, and time of presentation session, but may additionally include any of the information that composes the meter information. The list also includes DBSCAN specific parameters that are explored further in FIG. 9.

An example of additional meter information that the AME may include in the list of parameters to be used in distance measurement is the region of presentation. This is because streaming sources offer different media to different audiences, depending on their region. For example, suppose a media is available on a particular streaming platform in the United Kingdom, but the same media is not available on the same streaming platform in the United States. If the example model executor circuitry receives a media/streaming source association 113C that correctly matches the example media and streaming platform but with meter information including a presentation region of the United States due to a device-to-TV error, the example AME aims to not credit said meter information. If the region of presentation is considered in the distance calculation, the model executor circuitry 310 computes a large distance between meter information with the region of United States and meter information that correctly lists the region of United Kingdom and therefore assigns the meter information with region of the United States as noise.

As an additional example, the example AME may utilize the season number in the computation of distance. Suppose a show ran for 6 seasons on live television. Suppose every season is available for re-showing on live cable television, but only seasons 1-3 are available on a streaming service. If the example model executor circuitry 310 receives a media/streaming source association 113C that correctly matches the show and streaming service but does so with an episode from season 6 due to a device-to-TV error, the example model executor circuitry 310 may compute a large distance between meter information with season 6 listed and meter information with any of seasons 1-3 listed, thereby assigning the meter information with season 6 to be noise rather than a part of a cluster that represents any of the episodes from seasons 1-3 that are available for streaming and properly credited.

The example cluster creation circuitry 304 uses the historical meter information in block 602 and the parameters defined in block 604 to run the DBSCAN algorithm and create the example cluster landscape model 306. The process of running the DBSCAN algorithm is explored in FIG. 7. In doing so, the machine learning model has been trained and the example process 600 ends.

Figure 7:
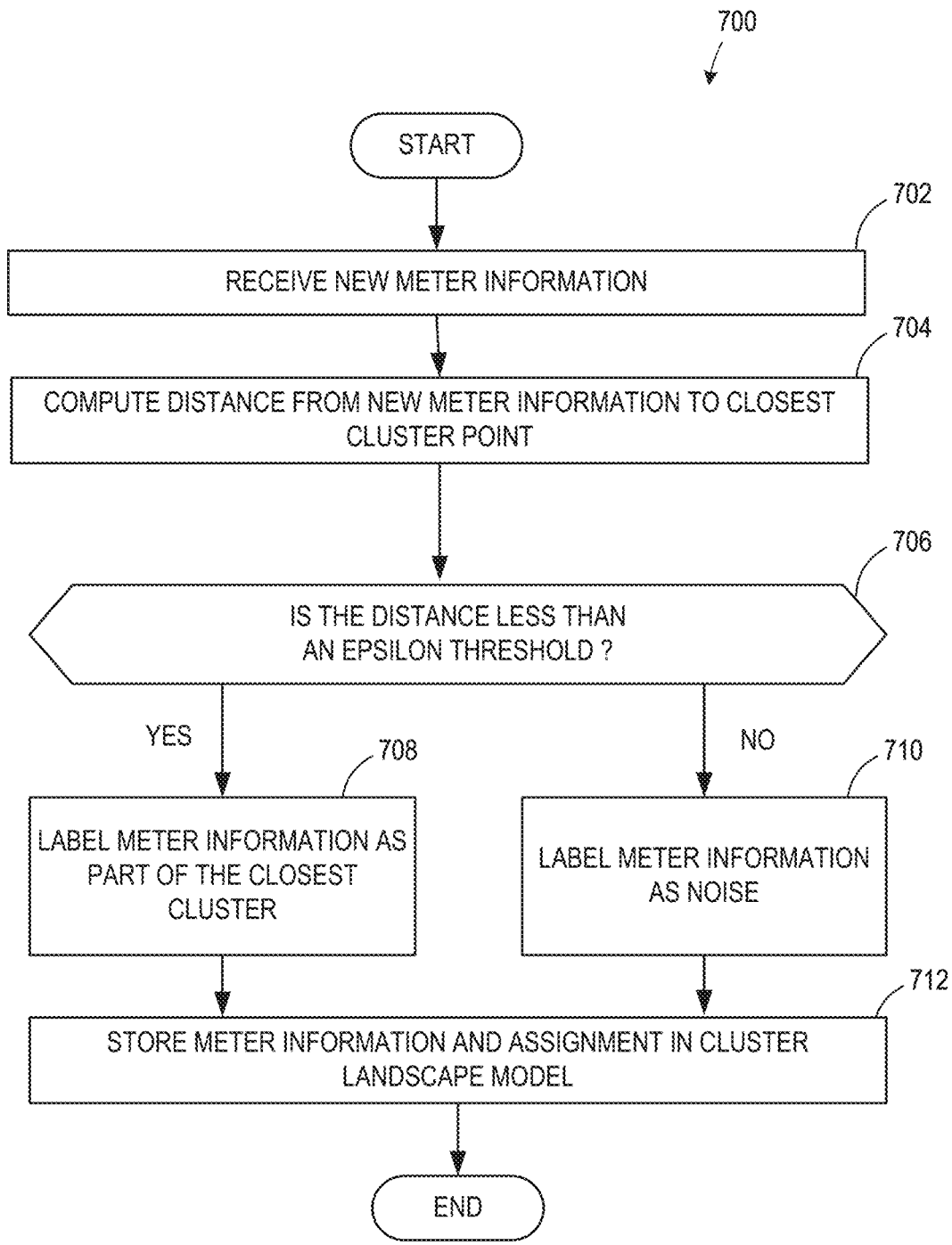
FIG. 7 is a flowchart representative of example machine readable instructions that may be executed by example processor circuitry to implement the execution of a machine learning model to accurately credit streaming sessions.

FIG. 7 is a flowchart representative of example machine readable instructions that may be executed by example processor circuitry to implement the execution of a machine learning model to accurately credit streaming sessions. The example process 700 begins when the example model executor circuitry 310 receives meter information 113 from the example meter data accessor circuitry 308, block 702. In the example process 700, the meter information includes information for a single streaming session. In some examples, the example model executor circuitry 310 may receive information from multiple streaming sessions.

The example model executor circuitry 310 uses the example cluster landscape model 306 to compute a distance from the new meter information 113 to the closest point in a cluster, block 704. The parameters that may be used to compute a distance are explored in FIG. 6. The process of computing a distance is explored further in FIG. 9.

The example model executor circuitry 310 determines if the distance is less than an epsilon threshold 706. The epsilon threshold is a DBSCAN specific parameter that is set by the example AME and explored further in FIGS. 6 and 9. If the distance is less than the epsilon threshold, the meter information is assigned to the closest cluster, block 708. If the distance is greater than the epsilon threshold, the meter information is instead assigned as noise, block 710.

The example model executor circuitry 310 adds both the meter information 113 and its assignment in the cluster landscape model, block 712. The added meter information 113 is used by the credit database interface circuitry 312 for potential crediting and by the example cluster creation circuitry 304 for potential model adjusting. After the meter information is added to the cluster landscape model 306, the example process 700 ends.

Figure 8:
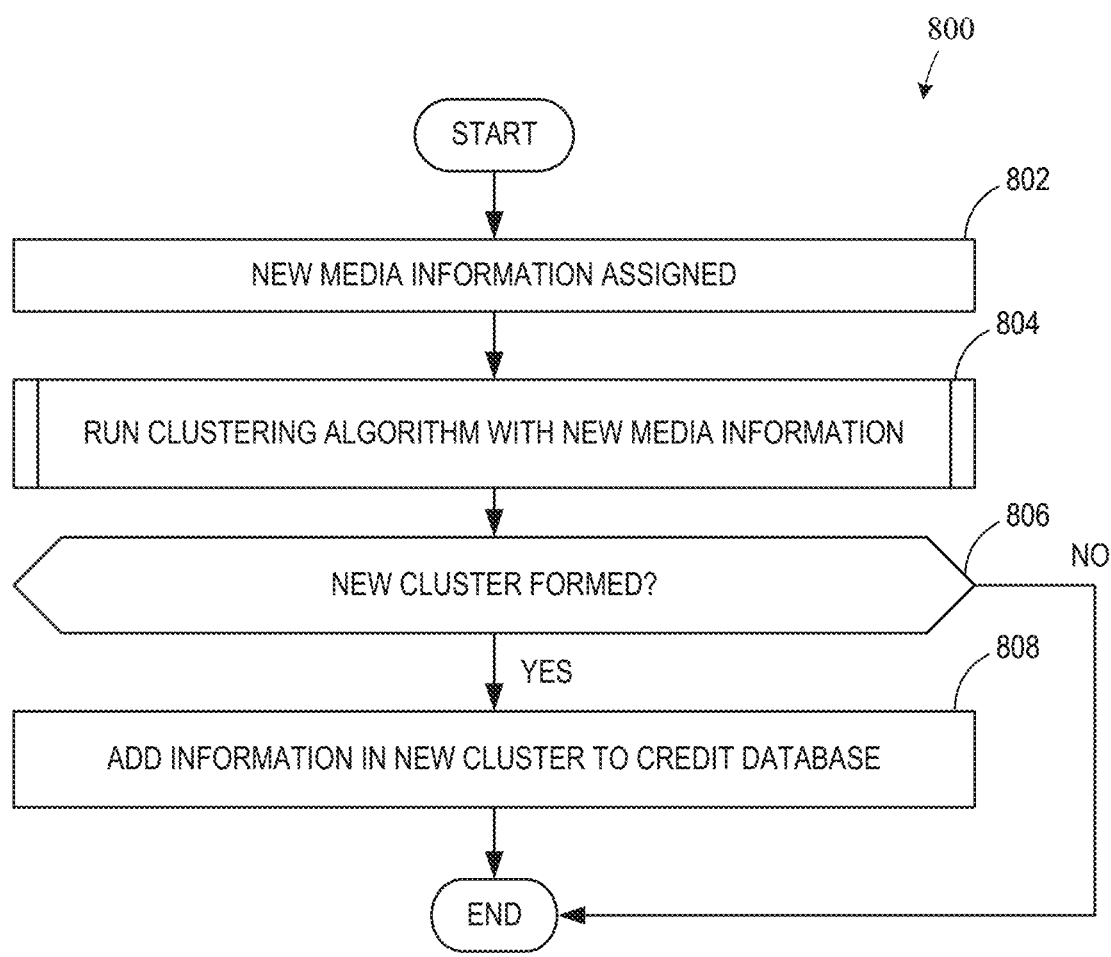
FIG. 8 is a flowchart representative of example machine readable instructions that may be executed by example processor circuitry to implement the adjustment of a cluster landscape model to accurately credit streaming sessions.

FIG. 8 is a flowchart representative of example machine readable instructions that may be executed by example processor circuitry to implement the adjustment of a cluster landscape model to accurately credit streaming sessions. The example process 800 begins when the example model execution circuitry assigns new media information as either a cluster or noise and adds the information to the example cluster landscape model 306, block 802. The example cluster creation circuitry 304 then runs the DBSCAN clustering algorithm, block 804. The DBSCAN algorithm forms a new cluster using the new media information if possible. Therefore, if a media information is initially assigned to be noise by the model executor circuitry 310, it may later be re-assigned to form a new cluster during the example process 800. The process of running the DBSCAN algorithm is explored in FIG. 9.

The example credit database interface circuitry 312 checks to see if a new cluster has been added to the example cluster model landscape 306, block 806. If a new cluster has been formed, the example credit database interface circuitry 312 adds all the media information in the new cluster to the credit database 118 via the network 114, block 808, and the example process 800 ends. If a new cluster is formed, block 808 is skipped and the example process 800 ends.

Figure 9:
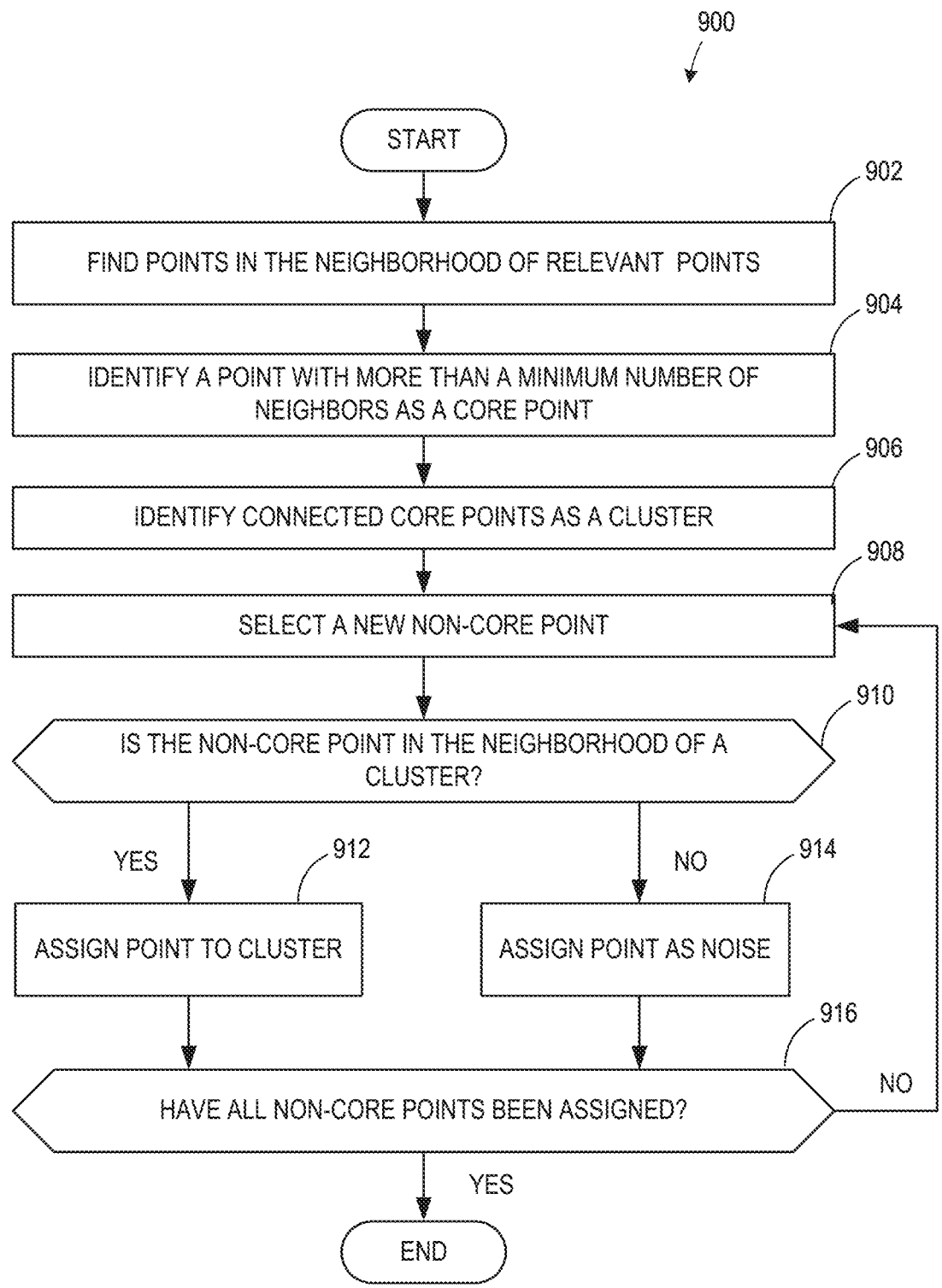
FIG. 9 is a flowchart representative of example machine readable instructions that may be executed by example processor circuitry to implement a known Density-based spatial clustering of applications with noise (DBSCAN) algorithm used in FIGS. 6, 8.

FIG. 9 is a flowchart representative of example machine readable instructions that may be executed by example processor circuitry to implement a known Density-based spatial clustering of applications with noise (DBSCAN) algorithm used in FIGS. 6, 8. The DBSCAN process 900 begins when the example cluster creation circuitry finds all points in the neighborhood of every relevant point, block 902. In this example, the term "point" is meant to refer to meter information 113 from a streaming session. In the example process 900, the number of relevant points is determined by when the DBSCAN algorithm is implemented. When implemented to train the machine learning model, block 606, every point from the historical training information is relevant. When implemented to adjust the machine learning model, block 804, only the new meter information entered in the example cluster landscape model by the example model executor circuitry are relevant. In some examples, every point in the cluster landscape model may be considered relevant.

A point is in a neighborhood of another point if the distance between points is less than a threshold referred to as epsilon. Epsilon is a value set by the example AME and received by the server data accessor circuitry 302 via the network 114. It is part of the DBSCAN specific parameters described in block 604.

In the DBSCAN process 900, the distance between two points is a function of n different parameters. These parameters are described further in FIG. 6. The method used to compute a distance is set by the example AME and received by the server data accessor circuitry 302 via the network 114. The method is part of the DBSCAN specific parameters described in block 604. The DBSCAN process 900 may compute distance using known Euclidean, Manhattan, and Chebyshev methods.

In the DBSCAN process 900, distances for each point may be computed through various means. In some examples, the cluster creation circuitry 304 is composed of multiple machines or processors that run parts of the DBSCAN process 900 and compute distances in parallel. In an alternative example, distances are computed sequentially.

The example cluster creation circuitry 304 identifies any point with more than a minimum number of neighbors to be a core point, block 904. The minimum number of neighbors is set by the example AME and received by the server data accessor circuitry 302 via the network 114. The cluster creation circuitry identifies groups of connected core points and creates a cluster out of each group, block 906. In this context, a core point is connected if all its neighbors are other core points in the group.

The example cluster creation circuitry 304 selects a non-core point, block 908, and determines if the non-core point is in the neighborhood of a cluster, block 910. The determination of a point being in a neighborhood uses the same epsilon threshold and distance methods described in block 902. If the non-core point is in the neighborhood of a cluster, the example cluster creation circuitry assigns the point to that cluster, block 912. Alternatively, if the non-core point is not in the neighborhood of a cluster, the example cluster creation circuitry assigns the point to be noise 404, block 914.

When the DBSCAN process 900 is used to train the model in the example process 600, the assignments of block 912 and block 914 are all initial assignments on historical training data that had yet to be assigned as a cluster or noise. When the DBSCAN process 900 is used to adjust the model in the example process 800, the assignments of block 912 and block 914 are being applied to meter information that already has an assignment from the example model executor circuitry 310. Therefore, the cluster creation circuitry either re-affirms or changes the assignment of new meter information during the model adjustment example process 800.

The cluster creation circuitry determines if all non-core points have been assigned to either a cluster or as noise, block 916. If all non-core points have been assigned, the example process 900 ends. If all non-core points have not been assigned, the example process 900 continues at block 908 by selecting a non-core point that has yet to be assigned a status.

Figure 10:
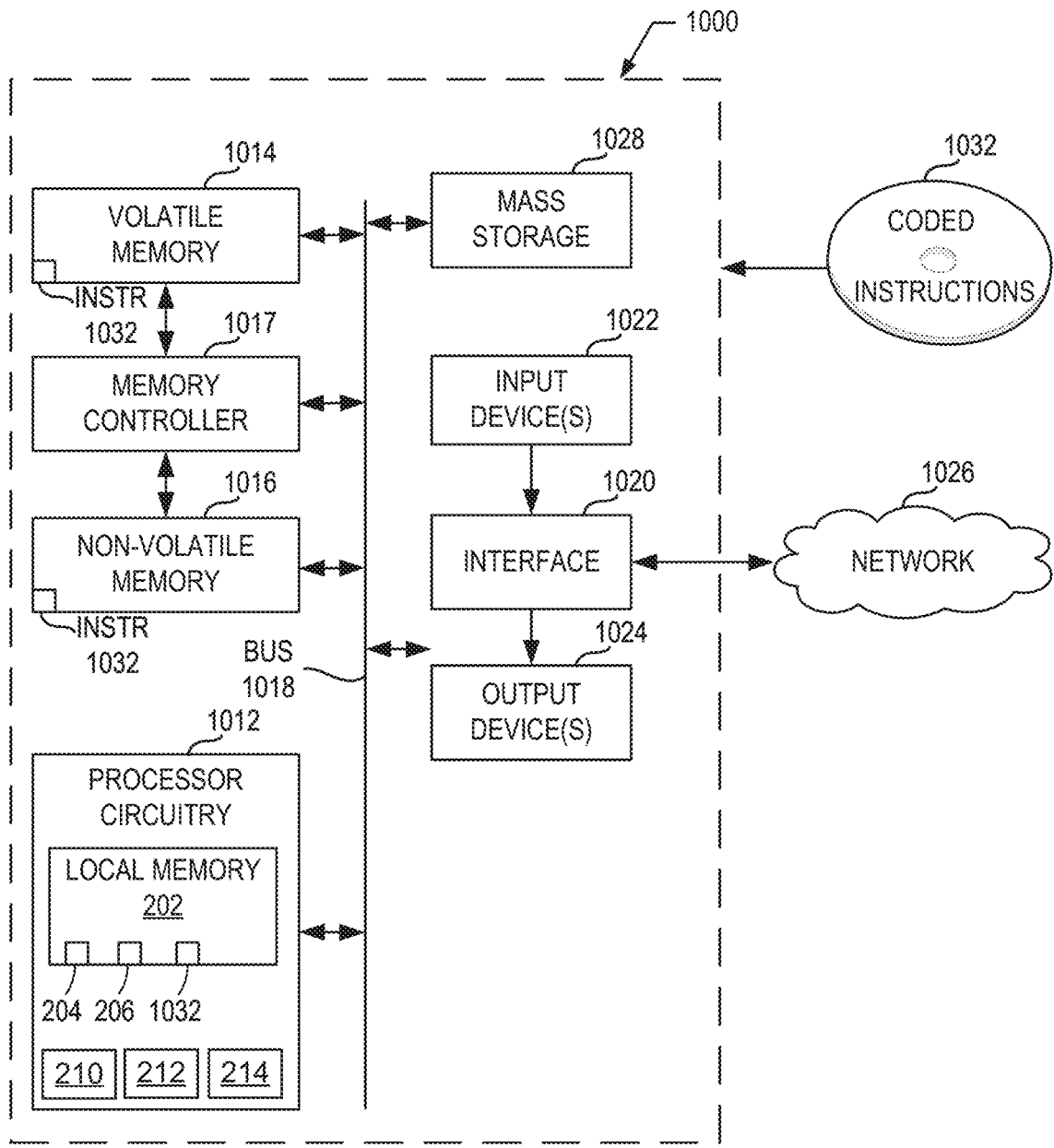
FIG. 10 is a block diagram of an example processing platform including processor circuitry structured to implement the example meter of FIG. 2.

FIG. 10 is a block diagram of an example processor platform 1000 structured to implement the example meter 112 of FIG. 2. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1000 of the illustrated example includes processor circuitry 1012. The processor circuitry 1012 of the illustrated example is hardware. For example, the processor circuitry 1012 can be implemented by one or more integrated circuits, logic circuits, FPGAs microprocessors, CPUs, GPUs, DSPs, and/or microcontrollers from any desired family or manufacturer. The processor circuitry 1012 may be implemented by one or more semiconductor based (e.g., silicon based) devices. In this example, the processor circuitry 1012 implements example identification circuitry 210, example measurement circuitry 212, example network interface circuitry 214 and/or, more generally, the example meter 112 of FIG. 2.

The processor circuitry 1012 of the illustrated example includes a local memory 202 (e.g., a cache, registers, etc.). The processor circuitry 1012 of the illustrated example is in communication with a main memory including a volatile memory 1014 and a non-volatile memory 1016 by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017.

The processor platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1022 are connected to the interface circuitry 1020. The input device(s) 1022 permit(s) a user to enter data and/or commands into the processor circuitry 1012. The input device(s) 1022 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1024 are also connected to the interface circuitry 1020 of the illustrated example. The output devices 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1000 of the illustrated example also includes one or more mass storage devices 1028 to store software and/or data. Examples of such mass storage devices 1028 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1032, which may implement the example meter 112, may be stored in the mass storage device 1028, in the volatile memory 1014, in the non-volatile memory 1016, and/or on a removable non-transitory computer readable storage medium such as a CD or DVD.

Figure 11:
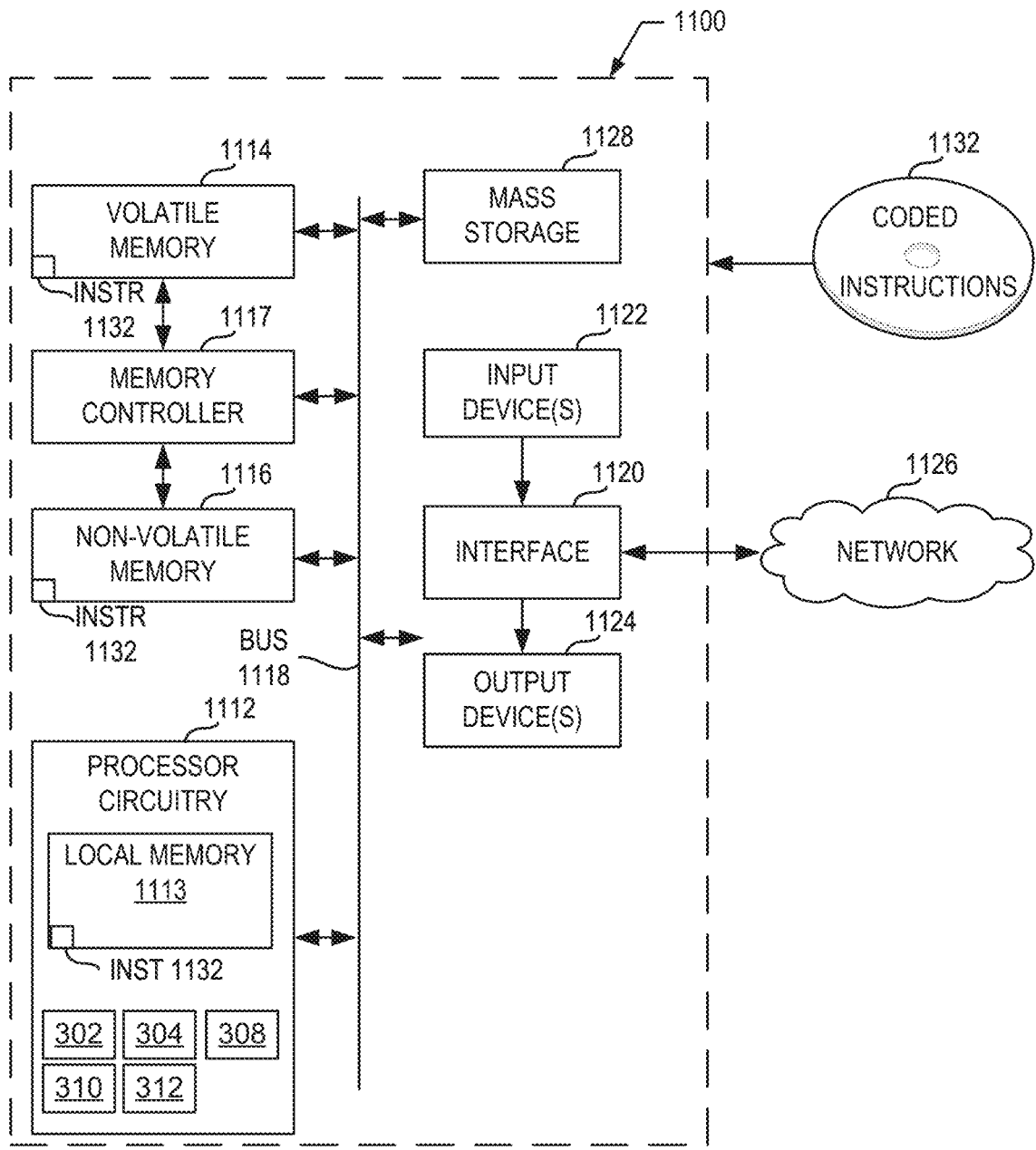
FIG. 11 is a block diagram of an example processing platform including processor circuitry structured to execute the example machine readable instructions of FIGS. 6-9 to implement the example machine learning circuitry of FIG. 3.

FIG. 11 is a block diagram of an example processor platform 1100 structured to execute and/or instantiate the machine readable instructions and/or operations of FIGS. 6-9 to implement the example machine learning circuitry 116 of FIG. 3. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1100 of the illustrated example includes processor circuitry 1112. The processor circuitry 1112 of the illustrated example is hardware. For example, the processor circuitry 1112 can be implemented by one or more integrated circuits, logic circuits, FPGAs microprocessors, CPUs, GPUs, DSPs, and/or microcontrollers from any desired family or manufacturer. The processor circuitry 1112 may be implemented by one or more semiconductor based (e.g., silicon based) devices. In this example, the processor circuitry 1112 implements example server data accessor circuitry 302, example cluster creation circuitry 304, example meter data accessor circuitry 308, example model executor circuitry 310, and/or, more generally, the example machine learning circuitry 116 of FIG. 3.

The processor circuitry 1112 of the illustrated example includes a local memory 1113 (e.g., a cache, registers, etc.). The processor circuitry 1112 of the illustrated example is in communication with a main memory including a volatile memory 1114 and a non-volatile memory 1116 by a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1116 may be implemented by flash memory and/or any other desired type of memory device. Access to the main memory 1114, 1116 of the illustrated example is controlled by a memory controller 1117.

The processor platform 1100 of the illustrated example also includes interface circuitry 1120. The interface circuitry 1120 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1122 are connected to the interface circuitry 1120. The input device(s) 1122 permit(s) a user to enter data and/or commands into the processor circuitry 1112. The input device(s) 1122 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1124 are also connected to the interface circuitry 1120 of the illustrated example. The output devices 1124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1120 of the illustrated example, thus, typically includes a graphics driver card, a graphics driver chip, and/or graphics processor circuitry such as a GPU.

The interface circuitry 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1126. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1100 of the illustrated example also includes one or more mass storage devices 1128 to store software and/or data. Examples of such mass storage devices 1128 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1132, which may be implemented by the machine readable instructions of FIGS. 6-9, may be stored in the mass storage device 1128, in the volatile memory 1114, in the non-volatile memory 1116, and/or on a removable non-transitory computer readable storage medium such as a CD or DVD.

Figure 12:
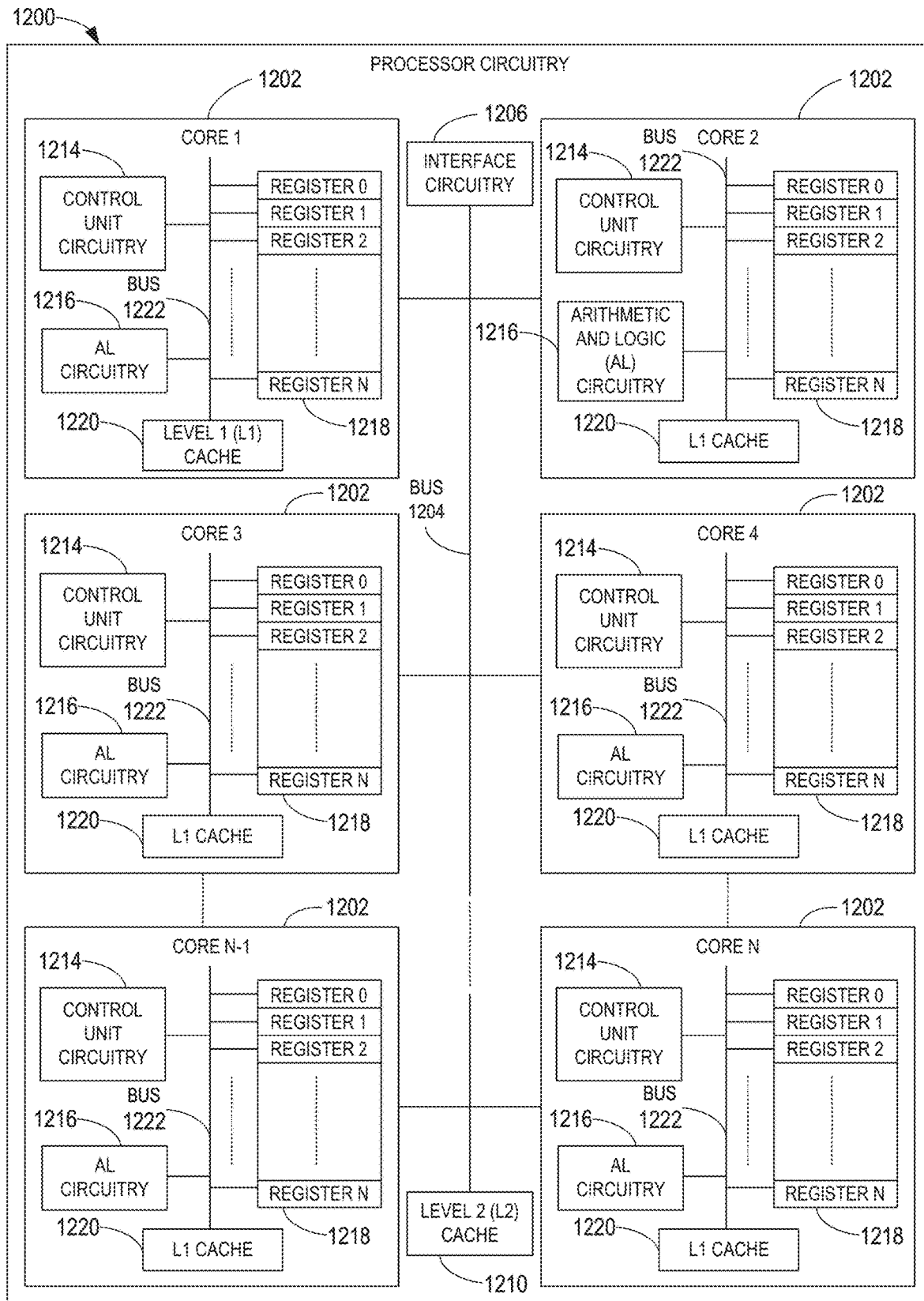
FIG. 12 is a block diagram of an example implementation of the processor circuitry of FIGS. 10-11.

FIG. 12 is a block diagram of an example implementation of the processor circuitry 1012, 1112 of FIGS. 10, 11. In this example, the processor circuitry 1012, 1112 of FIGS. 10, 11 is implemented by a microprocessor 1200. For example, the microprocessor 1200 may implement multi-core hardware circuitry such as a CPU, a DSP, a GPU, an XPU, etc. Although it may include any number of example cores 1202 (e.g., 1 core), the microprocessor 1200 of this example is a multi-core semiconductor device including N cores. The cores 1202 of the microprocessor 1200 may operate independently or may cooperate to execute machine readable instructions. For example, machine code corresponding to a firmware program, an embedded software program, or a software program may be executed by one of the cores 1202 or may be executed by multiple ones of the cores 1202 at the same or different times. In some examples, the machine code corresponding to the firmware program, the embedded software program, or the software program is split into threads and executed in parallel by two or more of the cores 1202. The software program may correspond to a portion or all of the machine readable instructions and/or operations represented by the flowchart of FIG. 12.

The cores 1202 may communicate by an example bus 1204. In some examples, the bus 1204 may implement a communication bus to effectuate communication associated with one(s) of the cores 1202. For example, the bus 1204 may implement at least one of an Inter-Integrated Circuit (I2C) bus, a Serial Peripheral Interface (SPI) bus, a PCI bus, or a PCIe bus. Additionally or alternatively, the bus 1204 may implement any other type of computing or electrical bus. The cores 1202 may obtain data, instructions, and/or signals from one or more external devices by example interface circuitry 1206. The cores 1202 may output data, instructions, and/or signals to the one or more external devices by the interface circuitry 1206. Although the cores 1202 of this example include example local memory 1220 (e.g., Level 1 (L1) cache that may be split into an L1 data cache and an L1 instruction cache), the microprocessor 1200 also includes example shared memory 1210 that may be shared by the cores (e.g., Level 2 (L2_ cache)) for high-speed access to data and/or instructions. Data and/or instructions may be transferred (e.g., shared) by writing to and/or reading from the shared memory 1210. The local memory 1220 of each of the cores 1202 and the shared memory 1210 may be part of a hierarchy of storage devices including multiple levels of cache memory and the main memory (e.g., the main memory 1014, 1016 of FIG. 10). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1202 may be referred to as a CPU, DSP, GPU, etc., or any other type of hardware circuitry. Each core 1202 includes control unit circuitry 1214, arithmetic and logic (AL) circuitry (sometimes referred to as an ALU) 1216, a plurality of registers 1218, the L1 cache 1120, and an example bus 1122. Other structures may be present. For example, each core 1202 may include vector unit circuitry, single instruction multiple data (SIMD) unit circuitry, load/store unit (LSU) circuitry, branch/jump unit circuitry, floating-point unit (FPU) circuitry, etc. The control unit circuitry 1214 includes semiconductor-based circuits structured to control (e.g., coordinate) data movement within the corresponding core 1202. The AL circuitry 1216 includes semiconductor-based circuits structured to perform one or more mathematic and/or logic operations on the data within the corresponding core 1202. The AL circuitry 1216 of some examples performs integer based operations. In other examples, the AL circuitry 1216 also performs floating point operations. In yet other examples, the AL circuitry 1216 may include first AL circuitry that performs integer based operations and second AL circuitry that performs floating point operations. In some examples, the AL circuitry 1216 may be referred to as an Arithmetic Logic Unit (ALU). The registers 1218 are semiconductor-based structures to store data and/or instructions such as results of one or more of the operations performed by the AL circuitry 1216 of the corresponding core 1202. For example, the registers 1218 may include vector register(s), SIMD register(s), general purpose register(s), flag register(s), segment register(s), machine specific register(s), instruction pointer register(s), control register(s), debug register(s), memory management register(s), machine check register(s), etc. The registers 1218 may be arranged in a bank as shown in FIG. 12. Alternatively, the registers 1218 may be organized in any other arrangement, format, or structure including distributed throughout the core 1202 to shorten access time. The bus 1220 may implement at least one of an I2C bus, a SPI bus, a PCI bus, or a PCIe bus Each core 1202 and/or, more generally, the microprocessor 1200 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1200 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 13:
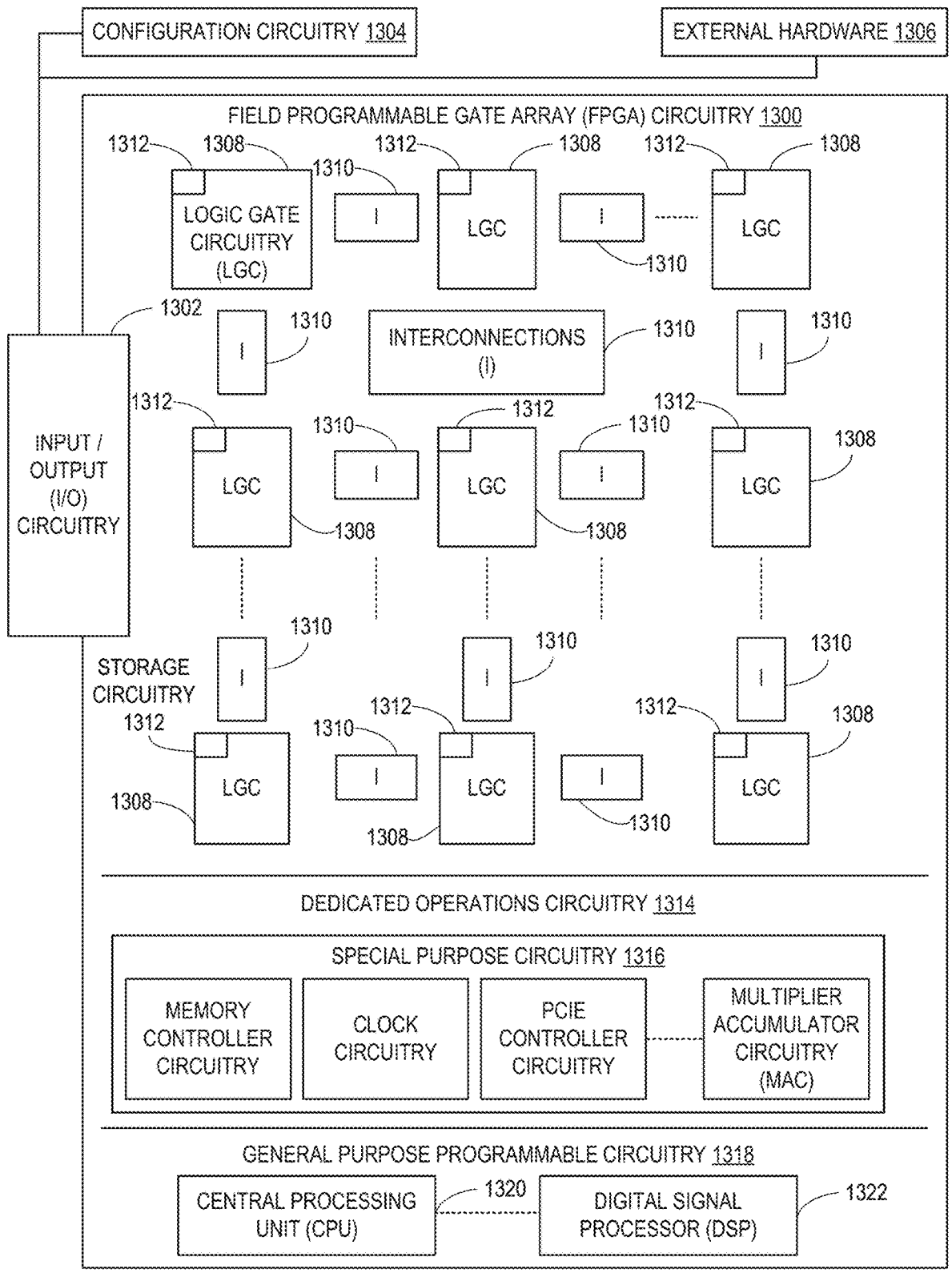
FIG. 13 is a block diagram of another example implementation of the processor circuitry of FIGS. 10-11.

FIG. 13 is a block diagram of another example implementation of the processor circuitry 1012, 1112 of FIGS. 10, 11. In this example, the processor circuitry 1012, 1112 is implemented by FPGA circuitry 1300. The FPGA circuitry 1300 can be used, for example, to perform operations that could otherwise be performed by the example microprocessor 1200 of FIG. 12 executing corresponding machine readable instructions. However, once configured, the FPGA circuitry 1300 instantiates the machine readable instructions in hardware and, thus, can often execute the operations faster than they could be performed by a general purpose microprocessor executing the corresponding software.

More specifically, in contrast to the microprocessor 1200 of FIG. 12 described above (which is a general purpose device that may be programmed to execute some or all of the machine readable instructions represented by the flowchart of FIGS. 6-9 but whose interconnections and logic circuitry are fixed once fabricated), the FPGA circuitry 1300 of the example of FIG. 13 includes interconnections and logic circuitry that may be configured and/or interconnected in different ways after fabrication to instantiate, for example, some or all of the machine readable instructions represented by the flowchart of FIGS. 6-9. In particular, the FPGA 1300 may be thought of as an array of logic gates, interconnections, and switches. The switches can be programmed to change how the logic gates are interconnected by the interconnections, effectively forming one or more dedicated logic circuits (unless and until the FPGA circuitry 1300 is reprogrammed). The configured logic circuits enable the logic gates to cooperate in different ways to perform different operations on data received by input circuitry. Those operations may correspond to some or all of the software represented by the flowchart of FIGS. 6-9. As such, the FPGA circuitry 1300 may be structured to effectively instantiate some or all of the machine readable instructions of the flowchart of FIGS. 6-9. as dedicated logic circuits to perform the operations corresponding to those software instructions in a dedicated manner analogous to an ASIC. Therefore, the FPGA circuitry 1300 may perform the operations corresponding to the some or all of the machine readable instructions of FIGS. 6-9 faster than the general purpose microprocessor can execute the same.

In the example of FIG. 13, the FPGA circuitry 1300 is structured to be programmed (and/or reprogrammed one or more times) by an end user by a hardware description language (HDL) such as Verilog. The FPGA circuitry 1300 of FIG. 13, includes example input/output (I/O) circuitry 1302 to obtain and/or output data to/from example configuration circuitry 1304 and/or external hardware (e.g., external hardware circuitry) 1306. For example, the configuration circuitry 1304 may implement interface circuitry that may obtain machine readable instructions to configure the FPGA circuitry 1300, or portion(s) thereof. In some such examples, the configuration circuitry 1304 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1306 may implement the microprocessor 1200 of FIG. 12. The FPGA circuitry 1300 also includes an array of example logic gate circuitry 1308, a plurality of example configurable interconnections 1310, and example storage circuitry 1312. The logic gate circuitry 1308 and interconnections 1310 are configurable to instantiate one or more operations that may correspond to at least some of the machine readable instructions of FIGS. 6-9 and/or other desired operations. The logic gate circuitry 1308 shown in FIG. 13 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1308 to enable configuration of the electrical structures and/or the logic gates to form circuits to perform desired operations. The logic gate circuitry 1308 may include other electrical structures such as look-up tables (LUTs), registers (e.g., flip-flops or latches), multiplexers, etc.

The interconnections 1310 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1308 to program desired logic circuits.

The storage circuitry 1312 of the illustrated example is structured to store result(s) of the one or more of the operations performed by corresponding logic gates. The storage circuitry 1312 may be implemented by registers or the like. In the illustrated example, the storage circuitry 1312 is distributed amongst the logic gate circuitry 1308 to facilitate access and increase execution speed.

The example FPGA circuitry 1300 of FIG. 13 also includes example Dedicated Operations Circuitry 1314. In this example, the Dedicated Operations Circuitry 1314 includes special purpose circuitry 1316 that may be invoked to implement commonly used functions to avoid the need to program those functions in the field. Examples of such special purpose circuitry 1316 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1300 may also include example general purpose programmable circuitry 1318 such as an example CPU 1320 and/or an example DSP 1322. Other general purpose programmable circuitry 1318 may additionally or alternatively be present such as a GPU, an XPU, etc., that can be programmed to perform other operations.

Although FIGS. 12 and 13 illustrate two example implementations of the processor circuitry 1012, 1112 of FIGS. 10, 11, many other approaches are contemplated. For example, as mentioned above, modern FPGA circuitry may include an on-board CPU, such as one or more of the example CPU 1320 of FIG. 13. Therefore, the processor circuitry 1012, 1112 of FIGS. 10, 11 may additionally be implemented by combining the example microprocessor 1200 of FIG. 12 and the example FPGA circuitry 1300 of FIG. 13. In some such hybrid examples, a first portion of the machine readable instructions represented by the flowcharts of FIGS. 6-9 may be executed by one or more of the cores 1202 of FIG. 12 and a second portion of the machine readable instructions represented by the flowcharts of FIGS. 6-9 may be executed by the FPGA circuitry 1300 of FIG. 13.

In some examples, the processor circuitry 1012, 1112 of FIGS. 10, 11 may be in one or more packages. For example, the processor circuitry 1200 of FIG. 12 and/or the FPGA circuitry 1300 of FIG. 13 may be in one or more packages. In some examples, an XPU may be implemented by the processor 1012, 1112 of FIGS. 10, 11, which may be in one or more packages. For example, the XPU may include a CPU in one package, a DSP in another package, a GPU in yet another package, and an FPGA in still yet another package.

Figure 14:
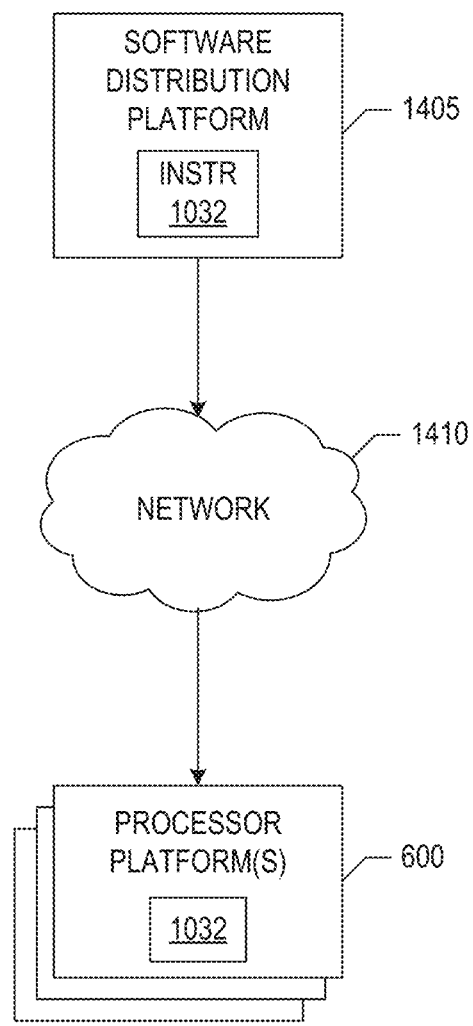
FIG. 14 is a block diagram of an example software distribution platform (e.g., one or more servers) to distribute software (e.g., software corresponding to the example machine readable instructions of FIGS. 6-9) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1405 to distribute software such as the example machine readable instructions 1032, 1132 of FIGS. 10, 11 to hardware devices owned and/or operated by third parties is illustrated in FIG. 14. The example software distribution platform 1405 may be implemented by any computer server, data facility, cloud service, etc., capable of storing and transmitting software to other computing devices. The third parties may be customers of the entity owning and/or operating the software distribution platform 1405. For example, the entity that owns and/or operates the software distribution platform 1405 may be a developer, a seller, and/or a licensor of software such as the example machine readable instructions 1032, 1132 of FIGS. 10, 11. The third parties may be consumers, users, retailers, OEMs, etc., who purchase and/or license the software for use and/or re-sale and/or sub-licensing. In the illustrated example, the software distribution platform 1405 includes one or more servers and one or more storage devices. The storage devices store the machine readable instructions 1032, 1132, which may correspond to the example machine readable instructions 602-606 of FIG. 6, 702-712 of FIG. 7, 802-810 of FIG. 8, and 902-916 of FIG. 9, as described above. The one or more servers of the example software distribution platform 1405 are in communication with a network 1410, which may correspond to any one or more of the Internet and/or any of the example networks 114 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1032, 1132 from the software distribution platform 1405. For example, the software, which may correspond to the example machine readable instructions 602-606 of FIG. 6, 702-712 of FIG. 7, 802-810 of FIG. 8, and 902-916 of FIG. 9, may be downloaded to the example processor platform 1000, which is to execute the machine readable instructions 1032, 1132 to implement the example machine learning circuitry 116. In some example, one or more servers of the software distribution platform 1405 periodically offer, transmit, and/or force updates to the software (e.g., the example machine readable instructions 1032, 1132 of FIGS. 10, 11) to ensure improvements, patches, updates, etc., are distributed and applied to the software at the end user devices.

From the foregoing, it will be appreciated that example systems, methods, apparatus, and articles of manufacture have been disclosed that accurately credit streaming sessions. The disclosed systems, methods, apparatus, and articles of manufacture improve the efficiency of using a computing device by using an unsupervised machine learning model to prevent invalid streaming sessions from being credited. The disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to load data within a machine learning accelerator are disclosed herein. Further examples and combinations thereof include the following:

Example 1 includes an apparatus to accurately credit streaming sessions, the apparatus comprising: memory; and processor circuitry including one or more of: at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations corresponding to instructions, and one or more registers to store a result of the one or more first operations, the instructions in the apparatus: a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations: or Application Specific Integrate Circuitry (ASIC) including logic gate circuitry to perform one or more third operations: the processor circuitry to perform at least one of the first operations, the second operations or the third operations to instantiate: cluster creation circuitry to create a cluster of streaming sessions, the cluster representing streaming sessions with the same media and streaming source: model executor circuitry to assign streaming sessions to the cluster or noise, the streaming sessions assigned to noise being outside the cluster; and credit database interface circuitry to identify streaming sessions assigned to the cluster as valid and streaming sessions assigned to noise as invalid, the valid streaming sessions being credited by the credit database interface circuitry.

Example 2 includes the apparatus of claim 1, wherein the cluster has a minimum number of streaming sessions.

Example 3 includes the apparatus of claim 1, wherein a distance exists between a first streaming session and a second streaming session, the distance determined by at least a name of the media, a name of the streaming sources, and a date and time of presentation for both the first streaming session and second streaming session.

Example 4 includes the apparatus of claim 3, wherein the distance between an un-assigned streaming session and streaming session in the cluster must be below an epsilon threshold for the un-assigned streaming session to be added to the cluster.

Example 5 includes the apparatus of claim 1, wherein the cluster creation circuitry re-assigns a streaming session labeled as noise by the model executor circuitry to a new cluster.

Example 6 includes the apparatus of claim 5, wherein the credit database interface circuitry credits all streaming sessions in the new cluster.

Example 7 includes at least one non-transitory machine-readable medium comprising instructions that, when executed, cause at least one processor to at least: create a cluster of streaming sessions, the cluster representing streaming sessions with the same media and streaming source; assign streaming sessions to the cluster or noise, the streaming sessions assigned to noise being outside the cluster; and identify streaming sessions assigned to the cluster as valid and streaming sessions assigned to noise as invalid, the valid streaming sessions being credited by the credit database interface circuitry.

Example 8 includes the at least one non-transitory machine-readable medium of claim 7, wherein the cluster has a minimum number of streaming sessions.

Example 9 includes the at least one non-transitory machine-readable medium of claim 7, wherein a distance exists between a first streaming session and a second streaming session, the distance determined by at least the name of media, name of streaming sources, and date and time of presentation for both streaming sessions.

Example 10 includes the at least one non-transitory machine-readable medium of claim 9, wherein the distance between an un-assigned streaming session and streaming session in a cluster must be below an epsilon threshold for the un-assigned streaming session to be added to the cluster.

Example 11 includes the at least one non-transitory machine-readable medium of claim 7, wherein the cluster creation circuitry re-assigns a streaming session labeled as noise by the model executor circuitry to a new cluster.

Example 12 includes the at least one non-transitory machine-readable medium of claim 11, wherein the credit database interface circuitry credits all streaming sessions in the new cluster.

Example 13 includes an apparatus for accurately crediting streaming sessions, the apparatus comprising: means for creating a cluster of streaming sessions, the cluster representing streaming sessions with the same media and streaming source: means for assigning streaming sessions to the cluster or noise, the streaming sessions assigned to noise being outside the cluster; and means for identifying streaming sessions assigned to the cluster as valid and streaming sessions assigned to noise as invalid, the valid streaming sessions being credited by the credit database interface circuitry.

Example 14 includes the apparatus of claim 13, wherein the means for creating a cluster of streaming sessions further includes the cluster having a minimum number of streaming sessions.

Example 15 includes the apparatus of claim 13, wherein the means for creating a cluster of streaming sessions and means for assigning streaming sessions to the cluster or noise further include a distance between a first streaming session and a second streaming session, the distance determined by at least the name of media, name of streaming sources, and date and time of presentation for both streaming sessions.

Example 16 includes the apparatus of claim 15, wherein the means for creating a cluster of streaming sessions and means for assigning streaming sessions to the cluster or noise further include the distance between an un-assigned streaming session and streaming session in the cluster being below a threshold epsilon for the un-assigned streaming session to be added to the cluster.

Example 17 includes the apparatus of claim 13, wherein the means for creating a cluster of streaming sessions further includes re-assigning a streaming session labeled as noise by the model executor circuitry to a new cluster.

Example 18 includes the apparatus of claim 17, wherein the means for creating a cluster of streaming sessions further includes crediting all streaming sessions in the new cluster.

Example 19 includes a method for accurately crediting streaming sessions, the method comprising: creating a cluster of streaming sessions, the streaming sessions assigned to noise being outside the cluster; assigning streaming sessions to the cluster or noise, the noise streaming sessions assigned outside the cluster; and identifying streaming sessions assigned to the cluster as valid and streaming sessions assigned to noise as invalid, the valid streaming sessions being credited by the credit database interface circuitry.

Example 20 includes the method of claim 19, wherein the cluster has a minimum number of streaming sessions.

Example 21 includes the method of claim 19, wherein a distance exists between a first streaming session and a second streaming session, the distance determined by at least the name of media, name of streaming sources, and date and time of presentation for both streaming sessions.

Example 22 includes the method of claim 21, wherein the distance between an un-assigned streaming session and streaming session in the cluster must be below a threshold epsilon for the un-assigned streaming session to be added to the cluster.

Example 23 includes the method of claim 19, further including re-assigning a streaming session labeled as noise by the model executor circuitry to a new cluster.

Example 24 includes the method of claim 23, further including crediting all streaming sessions in the new cluster.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A computing system comprising a processor and a memory, the computing system configured to perform a set of acts comprising:
    accessing training data comprising, for each of a plurality of reference television programs, respective reference media information for the reference television program and a respective reference streaming source for the reference television program, wherein the respective reference media information characterizes the reference television program, and wherein the respective reference streaming source identifies a streaming source that provides the reference television program to media devices;
    creating, using the training data, a cluster of streaming sessions, the cluster representing streaming sessions where the same television program is provided by a given streaming source;
    obtaining meter information indicative of a streaming session detected by a meter, the meter information identifying a detected television program and a detected streaming source;
    classifying, using the detected television program and the detected streaming source, the streaming session as belonging to the cluster or as being outside the cluster; and
    based on classifying the streaming session as being outside the cluster, identifying the streaming session as an invalid streaming session.

2. The computing system of claim 1, wherein the cluster has a minimum number of streaming sessions.

3. The computing system of claim 1, wherein a distance exists between a first streaming session and a second streaming session, the distance determined by at least a title, a name of the streaming sources, and a date and time of presentation for both the first streaming session and second streaming session.

4. The computing system of claim 3, wherein the distance between an un-assigned streaming session and streaming session in the cluster must be below an epsilon threshold for the un-assigned streaming session to be added to the cluster.

5. The computing system of claim 1, wherein the set of acts further comprises re-assigning a streaming session labeled as noise to a new cluster.

6. The computing system of claim 1, wherein the set of acts further comprises:
    classifying another streaming session as belonging to the cluster; and
    based on classifying the streaming session as belonging to the cluster, identifying the other streaming session as a valid streaming session.

7. A non-transitory machine-readable medium comprising instructions that, when executed, cause a computing system to perform a set of acts comprising:
    accessing training data comprising, for each of a plurality of reference television programs, respective reference media information for the reference television program and a respective reference streaming source for the reference television program, wherein the respective reference media information characterizes the reference television program, and wherein the respective reference streaming source identifies a streaming source that provides the reference television program to media devices;
    creating, using the training data, a cluster of streaming sessions, the cluster representing streaming sessions where the same television program is provided by a given streaming source;
    obtaining meter information indicative of a streaming session detected by a meter, the meter information identifying a detected television program and a detected streaming source;
    classifying, using the detected television program and the detected streaming source, the streaming session as belonging to the cluster or as being outside the cluster; and
    based on classifying the streaming session as being outside the cluster, identifying the streaming session as an invalid streaming session.

8. The non-transitory machine-readable medium of claim 7, wherein the cluster has a minimum number of streaming sessions.

9. The non-transitory machine-readable medium of claim 7, wherein a distance exists between a first streaming session and a second streaming session, the distance determined by at least the title, name of streaming sources, and date and time of presentation for both streaming sessions.

10. The non-transitory machine-readable medium of claim 9, wherein the distance between an un-assigned streaming session and streaming session in a cluster must be below an epsilon threshold for the un-assigned streaming session to be added to the cluster.

11. The non-transitory machine-readable medium of claim 7, wherein the set of acts further comprises re-assigning a streaming session labeled as noise to a new cluster.

12. The non-transitory machine-readable medium of claim 11, wherein the set of acts further comprises:
    classifying another streaming session as belonging to the cluster; and
    based on classifying the streaming session as belonging to the cluster, identifying the other streaming session as a valid streaming session.

13. A method comprising:
    accessing training data comprising, for each of a plurality of reference television programs, respective reference media information for the reference television program and a respective reference streaming source for the reference television program, wherein the respective reference media information characterizes the reference television program, and wherein the respective reference streaming source identifies a streaming source that provides the reference television program to media devices;

creating, using the training data, a cluster of streaming sessions, the cluster representing streaming sessions where the same television program is provided by a given streaming source;

obtaining meter information indicative of a streaming session detected by a meter, the meter information identifying a detected television program and a detected streaming source;

classifying, using the detected television program and the detected streaming source, the streaming session as belonging to the cluster or as being outside the cluster; and based on classifying the streaming session as being outside the cluster, identifying the streaming session as an invalid streaming session.

14. The method of claim 13, wherein the cluster has a minimum number of streaming sessions.

15. The method of claim 13, wherein a distance exists between a first streaming session and a second streaming session, the distance determined by at least the title, name of streaming sources, and date and time of presentation for both streaming sessions.

16. The method of claim 15, wherein the distance between an un-assigned streaming session and streaming session in the cluster must be below a threshold epsilon for the un-assigned streaming session to be added to the cluster.

17. The method of claim 13, further including re-assigning a streaming session labeled as noise to a new cluster.

18. The method of claim 17, further including:
classifying another streaming session as belonging to the cluster; and
based on classifying the streaming session as belonging to the cluster, identifying the other streaming session as a valid streaming session.

* * * * *